US012746714B2

(12) United States Patent
Zhang

(10) Patent No.: US 12,746,714 B2
(45) Date of Patent: Sep. 29, 2026

(54) METHOD OF FORMING RESIN COMPONENT WITH INSERT FOR VEHICLE INTERIOR

(71) Applicant: SHANGHAI YANFENG JINQIAO AUTOMOTIVE TRIM SYSTEMS CO., LTD., Novi, MI (US)

(72) Inventor: Junwei Zhang, Shanghai (CN)

(73) Assignee: SHANGHAI YANFENG JINQIAO AUTOMOTIVE TRIM SYSTEMS CO., LTD., Novi, MI (US)

( * ) Notice: Subject to any disclaimer, the term of this patent is extended or adjusted under 35 U.S.C. 154(b) by 129 days.

(21) Appl. No.: 18/520,489

(22) Filed: Nov. 27, 2023

(65) Prior Publication Data

US 2024/0091997 A1 Mar. 21, 2024

Related U.S. Application Data

(63) Continuation of application No. PCT/CN2022/091001, filed on May 5, 2022.

(30) Foreign Application Priority Data

May 28, 2021 (CN) ......................... 202110588452.6

(51) Int. Cl.
*B29C 45/17* (2006.01)
*B29C 45/14* (2006.01)
(Continued)

(52) U.S. Cl.
CPC .......... *B29C 45/1704* (2013.01); *B29C 45/14* (2013.01); *B29C 45/14008* (2013.01);
(Continued)

(58) Field of Classification Search
CPC ............................................. B29C 2045/0087
See application file for complete search history.

(56) References Cited

U.S. PATENT DOCUMENTS 5,948,343 A 9/1999 Hiroki et al.
8,550,154 B2 * 10/2013 Ojiro ..................... F28F 21/062 165/181
(Continued)

FOREIGN PATENT DOCUMENTS

CN 201739660 U 2/2011
CN 102333630 A 1/2012
(Continued)

OTHER PUBLICATIONS

FIT machine translation of DE 10 2008 046 602 A1, Mar. 11, 2010 (Year: 2010).*
(Continued)

*Primary Examiner* — Benjamin A Schiffman
(74) *Attorney, Agent, or Firm* — Amin, Turocy & Watson, LLP

(57) ABSTRACT

A method of producing a structure for a component for a vehicle interior may comprise providing a mold with an insert in a cavity, providing resin into the cavity, providing water into the cavity to push a projectile element through the insert into resin in the cavity, pushing the projectile element through the insert and resin across the cavity. The structure may comprise the insert and molded resin. The insert may comprise a metal insert (pipe, tube, etc.). The projectile element may comprise a multi-stage projectile element with a base stage separable from a front stage during forming of the structure. The structure may comprise a second section and a first section with a larger inner diameter than the second section. The insert may be provided in the first section. The base stage may remain in the formed resin structure between the first and second section.

20 Claims, 21 Drawing Sheets

(51) Int. Cl.

| | |
|---|---|
| ***B29C 45/37*** | (2006.01) |
| ***B62D 25/14*** | (2006.01) |
| *B29C 45/00* | (2006.01) |
| *B29K 305/00* | (2006.01) |
| *B29K 705/00* | (2006.01) |
| *B29L 31/00* | (2006.01) |
| *B29L 31/30* | (2006.01) |

(52) U.S. Cl.

CPC .. *B29C 45/14065* (2013.01); *B29C 45/14311* (2013.01); *B29C 45/14622* (2013.01); *B29C 45/14631* (2013.01); *B29C 45/1705* (2013.01); *B29C 45/37* (2013.01); *B62D 25/145* (2013.01); *B29C 2045/0087* (2013.01); *B29C 2045/14327* (2013.01); *B29C 2045/1707* (2013.01); *B29C 2045/1719* (2013.01); *B29C 2045/1728* (2013.01); *B29K 2305/00* (2013.01); *B29K 2705/00* (2013.01); *B29L 2031/001* (2013.01); *B29L 2031/3002* (2013.01); *B29L 2031/3008* (2013.01)

(56) References Cited

U.S. PATENT DOCUMENTS

| | | | | |
|---|---|---|---|---|
| 8,679,397 | B2 * | 3/2014 | Sakamoto | B29C 45/1704 264/573 |
| 8,697,209 | B2 * | 4/2014 | Glissmann | B29C 45/1711 428/35.7 |
| 8,827,690 | B2 * | 9/2014 | Sakamoto | B29C 45/1704 425/557 |
| 10,456,966 | B2 * | 10/2019 | Iwata | B29C 45/261 |
| 10,703,032 | B2 * | 7/2020 | Iwata | B29D 23/001 |
| 10,981,308 | B2 * | 4/2021 | Wolf | B29C 45/1704 |
| 12,179,399 | B2 * | 12/2024 | Dajek | B29C 45/14778 |
| 2011/0210482 | A1 * | 9/2011 | Sakamoto | F28F 1/16 165/185 |
| 2011/0254184 | A1 | 10/2011 | Eckardt | |
| 2011/0254203 | A1 | 10/2011 | Eckardt | |
| 2011/0285057 | A1 | 11/2011 | Ojiro et al. | |
| 2019/0009443 | A1 * | 1/2019 | Wolf | B29C 45/2612 |
| 2019/0070761 | A1 | 3/2019 | Duenkelmann | |
| 2020/0189168 | A1 | 6/2020 | Gleu et al. | |
| 2020/0290250 | A1 | 9/2020 | Wolf | |
| 2023/0417353 | A1 * | 12/2023 | Sakai | B29C 45/1704 |

FOREIGN PATENT DOCUMENTS

| | | | | | |
|---|---|---|---|---|---|
| CN | 107107419 | A | | 8/2017 | |
| CN | 111959615 | A | | 11/2020 | |
| CN | 113276340 | A | | 8/2021 | |
| DE | 102008023473 | A1 | * | 11/2009 | B29C 45/1734 |
| DE | 10 2008 046 602 | A1 | | 3/2010 | |
| DE | 102009001276 | B3 | * | 7/2010 | B29C 45/1704 |
| DE | 10 2011 100 132 | A1 | | 10/2012 | |
| DE | 10 2015 102 640 | A1 | | 8/2015 | |
| DE | 10 2014 226 500 | A1 | | 6/2016 | |
| EP | 2 226 176 | A | | 9/2010 | |
| EP | 3 238 907 | A1 | | 11/2017 | |
| JP | S62186968 | A | * | 8/1987 | |
| JP | H11-114997 | A | | 4/1999 | |
| JP | 2013212666 | A | * | 10/2013 | |
| WO | 2009/138431 | A1 | | 11/2009 | |
| WO | 2018/055515 | A1 | | 3/2018 | |
| WO | WO-2019034208 | A1 | * | 2/2019 | B29C 49/4247 |
| WO | 2021/043683 | A1 | | 3/2021 | |
| WO | WO-2025067610 | A1 | * | 4/2025 | B29C 45/14622 |

OTHER PUBLICATIONS

International Search Report and Written Opinion received for PCT Application Serial No. PCT/CN2022/091001 dated Jul. 21, 2022, 11 pages.

First Office Action received for Chinese Patent Application Serial No. 202110588452.6 dated Sep. 2, 2022, 7 pages (Only Original Copy).

Extended European Search Report received for European Patent Application Serial No. 22810324.8 dated Jan. 14, 2025, 17 pages.

Hopmann et al., "Prozesssicher Mit Projektil", Kunststoffe, Dec. 17, 2013, pp. 62-65.

* cited by examiner

METHOD OF FORMING RESIN COMPONENT WITH INSERT FOR VEHICLE INTERIOR

CROSS-REFERENCE TO RELATED APPLICATIONS

The present application is a continuation of PCT/International Patent Application No. PCT/CN2022/091001 titled "COMPONENT FOR VEHICLE INTERIOR" filed May 5, 2022, which claims the benefit of Chinese Patent Application No. 202110588452.6 filed May 28, 2021 (now Chinese Patent No. 113276340B).

The present application claims priority to and incorporates by reference in full the following patent applications: (a) PCT/International Patent Application No. PCT/CN2022/091001 titled "COMPONENT FOR VEHICLE INTERIOR" filed May 5, 2022; (b) Chinese Patent Application No. 202110588452.6 filed May 28, 2021 (now Chinese Patent No. 113276340B).

The present application is related to and incorporates by reference in full the following patent applications: (a) PCT/International Patent Application No. PCT/CN2022/091002 titled "COMPONENT FOR VEHICLE INTERIOR" filed May 5, 2022; (b) Chinese Patent Application No. 202110588490.1 filed May 28, 2021 (now Chinese Patent No. 113320085B).

FIELD

The present invention relates to a component for a vehicle interior.

The present invention also relates to a method of producing a component for a vehicle interior.

The present invention also relates to a tool for a method of producing a component for a vehicle interior.

BACKGROUND

It is known to produce a component by extrusion from a resin material; it is also known to use a projectile element to facilitate the extrusion of a component from a resin material.

It would be advantageous to provide an improved component for a vehicle interior.

It would also be advantageous to produce an improved component for a vehicle interior from a resin material with an improved method of producing a component.

It would further be advantageous to produce an improved component with an improved method in a mold tool.

It would further be advantageous to produce an improved component with an improved method in a mold tool using a projectile element.

It would further be advantageous to produce an improved component with an insert with an improved method in a mold tool using a projectile element.

It would further be advantageous to produce an improved two-section component with an insert with an improved method in a mold tool using a projectile element.

It would further be advantageous to produce an improved two-section component with an insert with an improved method in a two-section mold tool using a projectile element.

It would further be advantageous to produce an improved two-section component with an insert with an improved method in a two-section mold tool using a two-stage projectile element.

It would further be advantageous to produce an improved two-section component with an insert with an improved method in a two-section mold tool using a two-stage projectile element with one stage of the projectile element formed into the two-section component.

It would further be advantageous to produce an improved two-section component for a vehicle interior from a resin material with an insert with an improved method in a two-section mold tool using a two-stage projectile element pushed by water through a cavity in the mold tool.

SUMMARY

The present invention relates to a method of producing a structure with an insert for a component for a vehicle interior in a mold comprising a cavity using a projectile element comprising the steps of providing the mold with the cavity; providing the insert in the cavity; providing the projectile element at the cavity; providing resin into the cavity; providing water into the cavity to push the projectile element through the insert into resin in the cavity; pushing the projectile element through the insert and through resin across the cavity; and exiting the projectile element from the cavity. The insert may comprise a metal insert. The component may comprise a formed resin component with the metal insert from the mold. The insert may comprise an axial opening and a radial set of holes. The component may comprise a multi-section component comprising a first section and a second section. The first section of the component may have an inner diameter larger than an inner diameter of the second section of the component.

The present invention relates to a method of producing a structure with an insert for a component for a vehicle interior in a multi-section mold comprising a cavity with a first section and a second section using a multi-stage projectile element with a base stage and a front stage comprising the steps of providing the mold with multi-section cavity; providing the insert in the first section of the cavity; providing the multi-stage projectile element; providing resin into the cavity; providing water into the cavity to push the multi-stage projectile element through the insert into resin in the cavity; pushing the multi-stage projectile element through the insert and through resin across the first section of the cavity; separating the base stage of the multi-stage projectile element from the front stage of the multi-stage projectile element between the first section of the cavity and the second section of the cavity; pushing the front stage of the multi-stage projectile element through the insert and through resin across the second section of the cavity; and exiting the front stage of the multi-stage projectile element from the cavity. The front stage of the multi-stage projectile element may be separated from the base stage of the multi-stage projectile element at a feature between the first section of the cavity and the second section of the cavity. The component may comprise a resin component formed with the base stage of the multi-stage projectile element. The component may comprise a multi-section component comprising a first section and a second section. The component may comprise a resin component formed with the base stage of the multi-stage projectile element between the first section of the component and the second section of the component. The method may comprise the step of removing a resin component formed with the insert and the base stage of the multi-stage projectile element from the mold. The step of separating the base stage of the multi-stage projectile element from the front stage of the multi-stage projectile element may comprise engagement of the base stage of the multi-stage projectile element with a mold feature. The mold feature may be between the first section of the cavity and the second section of the cavity. The insert may comprise an axial opening and a radial set of holes. The step of separating the base stage of the multi-stage projectile element from the front stage of the multi-stage projectile element between the first section of the cavity and the second section of the cavity may comprise engagement of the base stage of the projectile element with a mold feature; the mold feature may comprise a reduction in size of an effective inner diameter between the first section of the cavity and the second section of the cavity.

The present invention relates to a component for a vehicle interior formed in a mold with a projectile element comprising a structure comprising a first section and a second section. The structure may be formed from a resin material. The structure may comprise a central opening formed by the projectile element. A cross-section area of the first section may be larger than a cross-section area of the second section. The structure may be formed by injecting water to push the projectile element through a cavity in the mold containing the resin material. The projectile element may comprise a perimeter surface. Water and resin material may be in contact adjacent the perimeter surface. The resin material may be provided as the perimeter surface of the structure. The projectile element may comprise a multi-stage element; the multi-stage element may comprise a front stage and a base stage; the base stage may be detachable from the front stage; the structure may comprise the base stage of the multi-stage projectile element. The component may comprise a cross-car beam. The first section of the structure may comprise a first diameter; the second section of the structure may comprise a second diameter; the first diameter may be greater than the second diameter.

The present invention relates to a method of producing a structure with an insert for a component for a vehicle interior in a mold comprising a cavity using a projectile element comprising the steps of providing the mold with the cavity, providing the insert in the cavity, providing the projectile element at the cavity, providing resin into the cavity, providing water into the cavity to push the projectile element through the insert into resin in the cavity, pushing the projectile element through the insert and through resin across the cavity, and exiting the projectile element from the cavity. The structure may comprise the insert and molded resin. The insert may comprise a metal insert. The component may comprise a formed resin component with the metal insert from the mold. The structure may comprise a tube. The insert may comprise a pipe. The insert may comprise a tube. The insert may comprise a metal tube. The insert may comprise a set of holes. The insert may comprise an axial opening and a radial set of holes. Providing resin may comprise injecting resin as a liquid. Providing water may comprise injecting water. Injecting water may comprise supplying water from a nozzle. The component may comprise a multi-section component comprising a first section and a second section. The insert may be provided in the first section of the component. The first section of the component may have an inner diameter larger than an inner diameter of the second section of the component.

The present invention relates to a method of producing a structure with an insert for a component for a vehicle interior in a multi-section mold comprising a cavity with a first section and a second section using a multi-stage projectile element with a base stage and a front stage comprising the steps of providing the mold with multi-section cavity, providing the insert in the first section of the cavity, providing the multi-stage projectile element, providing resin into the cavity, providing water into the cavity to push the multi-stage projectile element through the insert into resin in the cavity, pushing the multi-stage projectile element through the insert and through resin across the first section of the cavity, separating the base stage of the multi-stage projectile element from the front stage of the multi-stage projectile element between the first section of the cavity and the second section of the cavity, pushing the front stage of the multi-stage projectile element through the insert and through resin across the second section of the cavity, and exiting the front stage of the multi-stage projectile element from the cavity. The front stage of the multi-stage projectile element may be separated from the base stage of the multi-stage projectile element at a feature between the first section of the cavity and the second section of the cavity. The component may comprise a resin component. The component may comprise a resin component formed with the insert. The component may comprise a resin component formed with the base stage of the multi-stage projectile element. The component may comprise a multi-section component comprising a first section and a second section. The component may comprise a resin component formed with the base stage of the multi-stage projectile element between the first section of the component and the second section of the component. The method may comprise the step of removing a resin component from the mold. The method may comprise the step of removing a resin component formed with the insert from the mold. The method may comprise the step of removing a resin component formed with the base stage of the multi-stage projectile element from the mold. The method may comprise the step of removing a resin component formed with the insert and the base stage of the multi-stage projectile element from the mold. The insert may comprise a metal insert. The step of separating the base stage of the multi-stage projectile element from the front stage of the multi-stage projectile element may comprise engagement of the base stage of the multi-stage projectile element with a mold feature. The mold feature may be between the first section of the cavity and the second section of the cavity. The structure may comprise a tube. The insert may comprise a pipe. The insert may comprise a tube. The insert may comprise a metal tube. The insert may comprise a set of holes. The insert may comprise an axial opening and a radial set of holes. The step of providing resin may comprise injecting resin as a liquid. The step of providing water may comprise injecting water. The step of injecting water may comprise supplying water from a nozzle. The step of separating the front stage of the projectile element from the base stage of the projectile element may comprise engagement of the base stage of the projectile element with a mold feature; the mold feature may comprise a reduction in size of an effective inner diameter between the first section of the cavity and the second section of the cavity.

The present invention relates to a component for a vehicle interior formed in a mold with a projectile element comprising a structure comprising a first section and a second section. The structure may be formed from a resin material. The structure may comprise a central opening formed by the projectile element. A cross-section area of the first section may be larger than a cross-section area of the second section. The structure may comprise a transition section between the first section and the second section. The central opening may comprise an axial opening. The structure may comprise a tube structure. The structure may comprise an insert. The structure may comprise a section of a beam. The beam may comprise a cross-car beam comprising the structure. The structure may be formed by pushing the projectile element through a cavity in the mold containing the resin material. The structure may be formed by injecting water to push the projectile element through a cavity in the mold containing the resin material. Water and resin material may be separated by the projectile element. The projectile element may comprise a perimeter surface; water and resin material may be in contact adjacent the perimeter surface. The resin material may be provided as the perimeter surface of the structure. The component may comprise a formed resin component. The projectile element may comprise a multi-stage element. The multi-stage element may comprise a front stage and a base stage. The base stage may be detachable from the front stage. The structure may comprise the base stage of the multi-stage projectile element. The structure may comprise the base stage of the multi-stage projectile element between the first section and the second section. The structure may be formed with the base stage of the multi-stage projectile element between the first section and the second section. The mold tool may comprise a cavity with a first section and a second section. The first section of the structure may be formed in the first section of the cavity and the second section of the structure may be formed in the second section of the cavity. The first section of the structure may comprise a first diameter. The second section of the structure may comprise a second diameter. The first diameter may be greater than the second diameter. The component may comprise a cross-car beam.

The present invention relates to a component for a vehicle interior comprising an insert produced by a method in a mold comprising a cavity using a projectile element comprising the steps of providing the mold with the cavity, providing the insert in the cavity, providing the projectile element at the cavity, providing resin into the cavity, providing water into the cavity to push the projectile element through the insert into resin in the cavity, pushing the projectile element through the insert and through resin across the cavity, and exiting the projectile element from the cavity.

The present invention relates to a component for a vehicle interior comprising an insert and a multi-section structure comprising a first section and a second section produced by a method in a mold comprising a multi-section cavity with a first section and a second section using a multi-stage projectile element with a base stage and a front stage comprising the steps of providing the mold with the multi-section cavity, providing the insert in the first section of the cavity, providing the multi-stage projectile element, providing resin into the cavity, providing water into the cavity to push the multi-stage projectile element through the insert into resin in the cavity, pushing the multi-stage projectile element through the insert and through resin across the first section of the cavity, separating the base stage of the multi-stage projectile element from the front stage of the multi-stage projectile element between the first section of the cavity and the second section of the cavity, pushing the front stage of the multi-stage projectile element through the insert and through resin across the second section of the cavity, and exiting the front stage of the multi-stage projectile element from the cavity. The multi-stage projectile element may comprise a two-stage projectile element. The multi-section cavity may comprise a two-stage cavity. The multi-section structure may comprise a two-section structure. The two-section structure may comprise a transition section between the first section and the second section.

The present invention relates to a tool configured for use in a method of producing a resin-formed structure for a component for a vehicle interior in a mold with a cavity having first section and a second section comprising a projectile element comprising a front stage and a base stage. The base stage may be (a) attachable to the front stage for entry into the first section of the cavity of the mold and (b) detachable from the front stage before entry into the second section of the cavity of the mold; so that the resin-formed structure for the component formed in the mold may comprise the base stage of the projectile element. The base stage of the projectile element may comprise an outer diameter larger than an outer diameter of the front stage of the projectile element. The method may comprise the steps of providing the mold with the cavity, providing an insert in the cavity, providing the projectile element at the cavity, providing resin into the cavity, providing water into the cavity to push the projectile element through the insert into resin in the cavity, pushing the projectile element through the insert and through resin across the cavity, exiting the projectile element from the cavity. The method may comprise the step of separating the base stage of the projectile element from the front stage of the projectile element between the first section of the cavity and the second section of the cavity. The mold may comprise a mold feature; the step of separating the base stage of the projectile element from the front stage of the projectile element between the first section of the cavity and the second section of the cavity may comprise engaging the base stage of the projectile element on the mold feature. The resin-formed structure may comprise a first section and a second section; the step of separating the base stage of the projectile element between the front section of the cavity and the second section of the cavity may comprise engaging the base stage of the projectile element on the mold feature so that the resin-formed structure formed in the mold may comprise the base stage of the projectile element between the first section and the second section of the structure. The first section of the resin-formed structure may comprise the insert. The insert may comprise a metal insert. The step of pushing the projectile element through the insert and through resin across the cavity may comprise forming the first section of the resin-formed structure with the insert and separating the base stage of the projectile element from the front stage of the projectile element before forming the second section of the resin-formed structure with the front stage of the projectile element. The tool may comprise projections configured (a) to engage in recesses to attach the base stage of the projectile element to the front stage of the projectile element and (b) to disengage and separate from recesses to detach the base stage of the projectile element from the front stage of the projectile element. The front stage of the projectile element may comprise projections and the base stage of the projectile element may comprise recesses for the projections. The base stage of the projectile element may have a generally frusto-conical shape. The front stage of the projectile element may have a generally conical shape.

The present invention relates to a method of producing a structure with an insert for a component for a vehicle interior in a mold comprising a cavity using a projectile element. The method may comprise the steps of providing the mold with the cavity; providing the insert in the cavity; providing resin into the cavity; providing the projectile element at the cavity; providing water into the cavity to push the projectile element through the insert into resin in the cavity; pushing the projectile element through the insert and through resin across the cavity; exiting the projectile element from the cavity. The structure may comprise the insert and molded resin. The insert may comprise a metal insert. The component may comprise a formed resin component with the metal insert from the mold. The structure may comprise a tube. The insert may comprise a pipe. The insert may comprise a tube. The insert may comprise a metal tube. The insert may comprise a set of holes. The insert may comprise an axial opening and a radial set of holes. Providing resin may comprise injecting resin as a liquid. Providing water may comprise injecting water. Injecting water may comprise supplying water from a nozzle. The component may comprise a multi-section component comprising a first section and a second section. The insert may be provided in the first section of the component. The first section of the component may have an inner diameter larger than an inner diameter of the second section of the component.

The present invention relates to a method of producing a structure with an insert for a component for a vehicle interior in a multi-section mold comprising a cavity with a first section and a second section using a multi-stage projectile element with a front stage and a base stage. The method may comprise the steps of providing the mold with multi-section cavity; providing the insert in the first section of the cavity; providing resin into the cavity; providing the multi-stage projectile element; providing water into the cavity to push the multi-stage projectile element through the insert into resin in the cavity; pushing the projectile element through the insert and through resin across the first section of the cavity; separating the base stage of the projectile element from the front stage of the projectile element between the first section of the cavity and the second section of the cavity; pushing the front stage of the projectile element through the insert and through resin across the second section of the cavity; exiting the front stage of the projectile element from the cavity. The front stage of the projectile element may be separated from the base stage of the projectile element between the first section of the cavity and the second section of the cavity. The component may comprise a resin component. The component may comprise a resin component formed with the insert. The component may comprise a resin component formed with the base stage of the projectile element. The component may comprise a multi-section component comprising a first section and a second section. The component may comprise a resin component formed with the base stage of the projectile element between the first section of the component and the second section of the component. The method may comprise the step of removing a resin component from the mold. The method may comprise the step of removing a resin component formed with the insert from the mold. The method may comprise the step of removing a resin component formed with the base stage of the projectile element from the mold. The method may comprise the step of removing a resin component formed with the metal insert and the base stage of the projectile element from the mold. The insert may comprise a metal insert. The step of separating the base stage of the projectile element from the front stage of the projectile element may comprise engagement of the projectile element with a mold feature. The mold feature may be between the first section of the cavity and the second section of the cavity. The structure may comprise a tube. The insert may comprise a pipe. The insert may comprise a tube. The insert may comprise a metal tube. The insert may comprise a set of holes. The insert may comprise an axial opening and a radial set of holes. The step of providing resin may comprise injecting resin as a liquid. The step of providing water may comprise injecting water. The step of injecting water may comprise supplying water from a nozzle.

The present invention relates to a component for a vehicle interior in a mold with a projectile element comprising a structure comprising a first section and a second section. The structure may be formed from a resin material. The structure may comprise a central opening formed by the projectile element. A cross-section area of the first section may be larger than a cross-section area of the second section. The structure may comprise a transition section between the first section and the second section. The central opening may comprise an axial opening. The structure may comprise a tube structure. The structure may comprise an insert. The structure may comprise a section of a beam. The beam may comprise a cross-car beam comprising the structure. The structure may be formed by pushing the projectile element through a cavity in a mold containing the resin material. The structure may be formed by injecting water to push the projectile element through a cavity in a mold containing resin material. Water and resin material may be separated by the projectile element. The projectile element may comprise a perimeter surface; water and resin material may be in contact adjacent the perimeter surface. The resin material may be provided at the perimeter surface of the structure. The component may comprise a formed resin component. The projectile element may comprise a multi-stage element. The multi-stage element may comprise a first stage and a second stage. The second stage may be detachable from the first stage. The structure may comprise the second stage of the projectile element. The structure may comprise the second stage of the projectile element between the first section and the second section. The structure may be formed with the second stage of the projectile element between the first section and the second section. The structure may be formed in a mold tool. The mold tool may comprise a first section and a second section. The first section of the structure may be formed in the first section of the mold tool and the second section of the structure may be formed in the second section of the mold tool. The structure may comprise a first section and a second section. The first section may comprise a first cross-section area. The second section may comprise a second cross-section area. The second cross-section area may be greater than the first cross-section area. The first section may comprise a first diameter. The second section may comprise a second diameter. The second diameter may be greater than the first diameter. The structure may comprise a tube structure. The component may comprise a cross-car beam.

The present invention relates to a component for a vehicle interior comprising an insert may be produced by a method in a mold comprising a cavity using a projectile element. The method may comprise the steps of providing the mold with the cavity; providing the insert in the cavity; providing resin into the cavity; providing the projectile element at the cavity; providing water into the cavity to push the projectile element through the insert into resin in the cavity; pushing the projectile element through the insert and through resin across the cavity; exiting the projectile element from the cavity.

The present invention relates to a component for a vehicle interior comprising an insert and a multi-section structure comprising a first section and a second section may be produced by a method in a mold comprising a multi-section cavity with a first section and a second section using a multi-stage projectile element with a first stage and a second stage. The method may comprise the steps of providing the mold with the multi-section cavity; providing the insert in the first section of the cavity; providing resin into the cavity; providing the multi-stage projectile element; providing water into the cavity to push the multi-stage projectile element through the insert into resin in the cavity; pushing the projectile element through the insert and through resin across the first section of the cavity; separating the second stage of the projectile element from the first stage of the projectile element between the first section of the cavity and the second section of the cavity; pushing the first stage of the projectile element through the insert and through resin across the second section of the cavity; exiting the first stage of the projectile element from the cavity. The multi-stage projectile element may comprise a two-stage projectile element. The multi-section cavity may comprise a two-stage cavity. The multi-section structure may comprise a two-section structure. The two-section structure may comprise a transition section between the first section and the second section. The multi-section structure may comprise a transition section between the first section and the second section.

The present invention relates to a tool configured for use in a method of producing a resin-formed structure for a component for a vehicle interior in a multi-section mold with a cavity having first section and a second section comprising a projectile element comprising a first stage and a second stage; the second stage may be attachable to the first stage for entry into the first section of the cavity of the mold and detachable from the first stage before the second section of the cavity of the mold; so that the resin-formed structure for the component formed in the mold may comprise the second stage. The method may comprise the steps of providing the mold with the cavity; providing an insert in the cavity; providing resin into the cavity; providing the projectile element at the cavity; providing water into the cavity to push the projectile element through the insert into resin in the cavity; pushing the projectile element through the insert and through resin across the cavity; exiting the projectile element from the cavity. The second stage of the projectile element may comprise an outer diameter larger than an outer diameter of the first stage of the projectile element. The method may comprise the step of separating the second stage of the projectile element between the first section of the cavity and the second section of the cavity. The mold may comprise a mold feature; the step of separating the second stage of the projectile element between the first section of the cavity and the second section of the cavity may comprise engaging the second stage of the projectile element on the mold feature. The resin-formed structure may comprise a first section and a second section; the step of separating the second stage of the projectile element between the first section of the cavity and the second section of the cavity may comprise engaging the second stage of the projectile element on the mold feature so that the resin-formed structure formed in the mold may comprise the second stage of the projectile element between the first section and the second section of the structure. The first section of the resin-formed structure may comprise the insert; the insert may comprise a metal insert. The step of pushing the projectile element through the insert and through resin across the cavity may comprise forming the first section of the resin-formed structure on the insert and separating the second stage of the projectile element from the first stage of the projectile element before forming the second section of the resin-formed structure with the first stage of the projectile element. The projectile element may comprise projections configured (a) to engage in recesses to attach the second stage of the projectile element to the first stage of the projectile element and (b) to disengage and separate from recesses to detach the second stage of the projectile element from the first stage of the projectile element; the first stage of the projectile element may comprise projections and the second stage of the projectile element may comprise recesses for the projections. The second stage of the projectile element may have a generally frusto-conical shape; the first stage of the projectile element may have a generally conical shape.

The present invention relates to an insert injection molding method comprising: providing a metal pipe and fixing the metal pipe in a cavity of a mold; a plurality of through holes may be arranged in the metal pipe; a first gap may be formed between the metal pipe and an inner surface of the cavity; providing a projectile connected with a nozzle and placing the projectile within the cavity; injecting a resin melt into the cavity after closing the mold; the resin melt fills the first gap and fills an interior of the metal pipe through the through holes in the metal pipe; applying a pressurized water flow to the projectile by the nozzle to enable the projectile to pass through the interior of the metal pipe to extrude a portion of the resin melt inside the metal pipe; arranging the projectile to form a second gap with an inner wall surface of the metal pipe; the resin melt in the second gap may remain inside the metal pipe; and opening the mold after the resin melt in the cavity is cooled and solidified, and finishing injection molding. At least one first positioning rib may be arranged on the inner surface of the cavity. The at least one first positioning rib may be inserted into at least one through hole of the metal pipe. The inner surface of the cavity may be provided with a plurality of bosses axially along the metal pipe. The metal pipe may be abutted against the bosses. The cavity may comprise at least two cavity segments. The metal pipe may be secured within at least one of the at least two cavity segments. The at least two cavity segments may have different inner diameters. The projectile may comprise at least two-stage detachably connected projection parts. The projection parts may correspond to the cavity segments one by one. The projection parts may stay sequentially in the corresponding cavity segments during the travel of the projectile. The projectile may comprise a first-stage projection part and a second-stage projection part. The first-stage projection part may comprise a through-type structure with two open ends. The second-stage projection part may comprise an open end and a hollow interior. The first-stage projection part may be connected with the open end of the second-stage projection part. An end surface of the first-stage projection part may be provided with a plurality of openings. An end surface of the second-stage projection part may comprise a plurality of axially extending second positioning ribs matching with the openings. An injection molded part may be manufactured by the insert injection molding method. The part may comprise a metal pipe and a resin structure. The resin structure may be formed to cover an inner surface of the metal pipe after passing through the metal pipe from an outer surface of the metal pipe.

FIGURES

DESCRIPTION

Figure 1A:
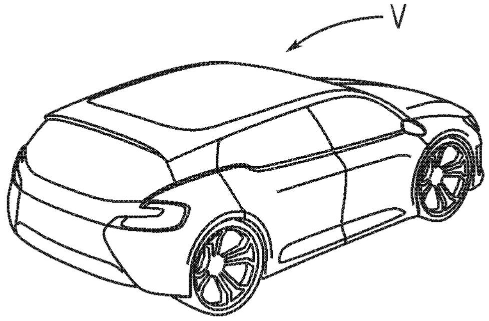
FIGS. 1A and 1B are schematic perspective views of a vehicle according to an exemplary embodiment.
Figure 1B:
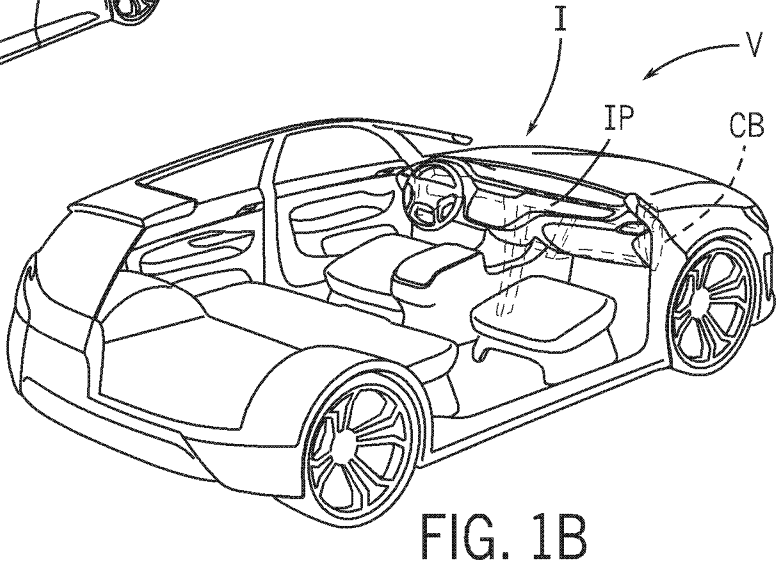
Figure 2:
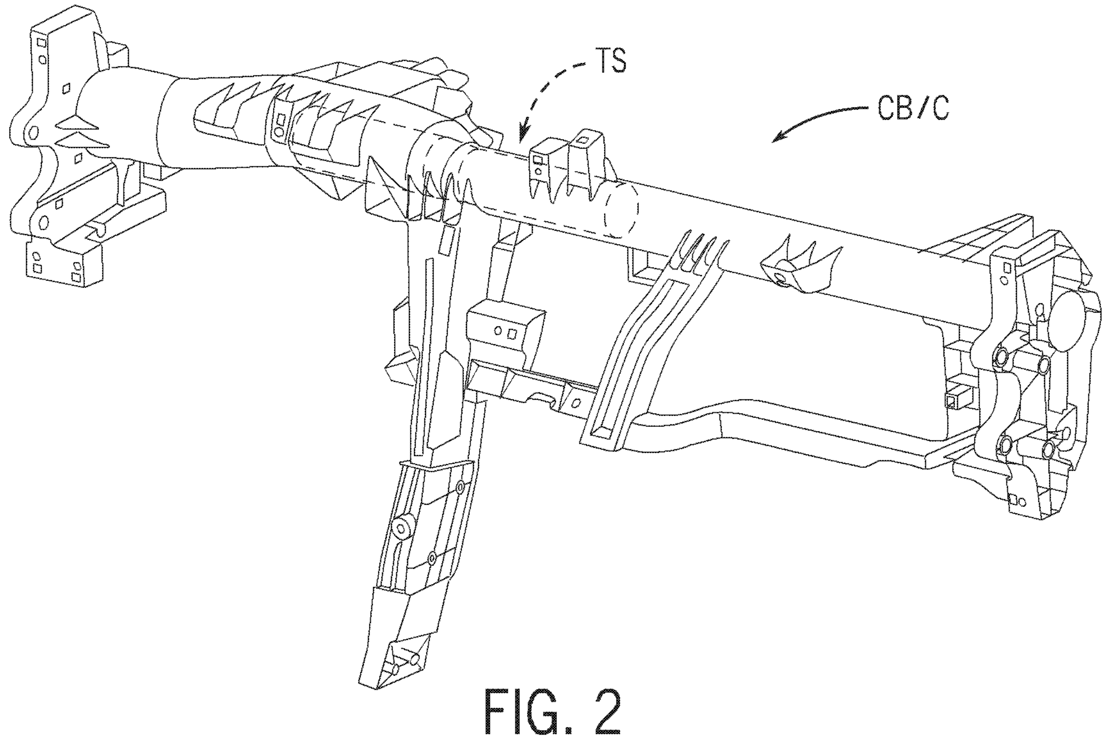
FIG. 2 is a schematic perspective view of a component shown as a cross-beam with a structure according to an exemplary embodiment.
Figure 3:
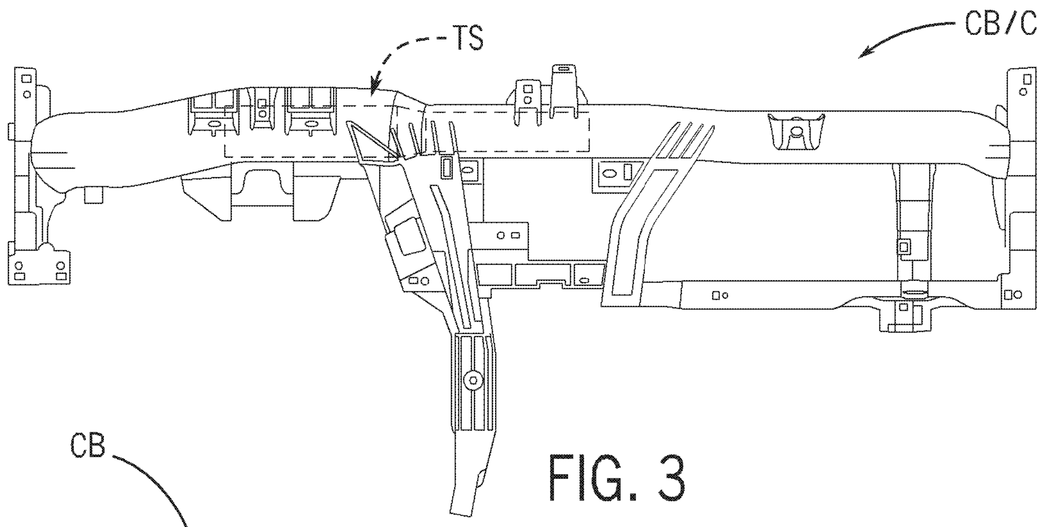
FIG. 3 is a schematic front elevation view of a component shown as a cross-beam with a structure according to an exemplary embodiment.
Figure 3A:
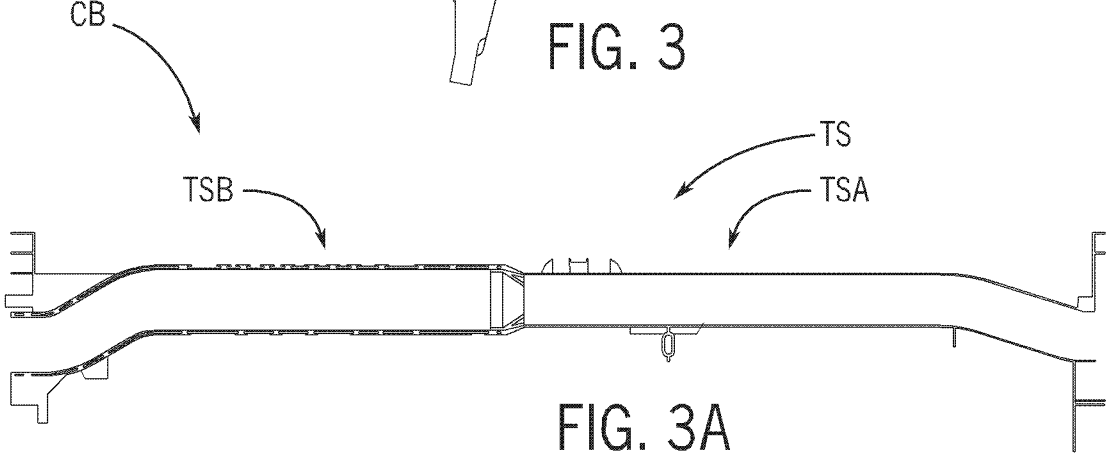
FIGS. 3A and 3B are schematic cross-section views of a component shown as a cross-beam with a structure according to an exemplary embodiment.
Figure 3B:
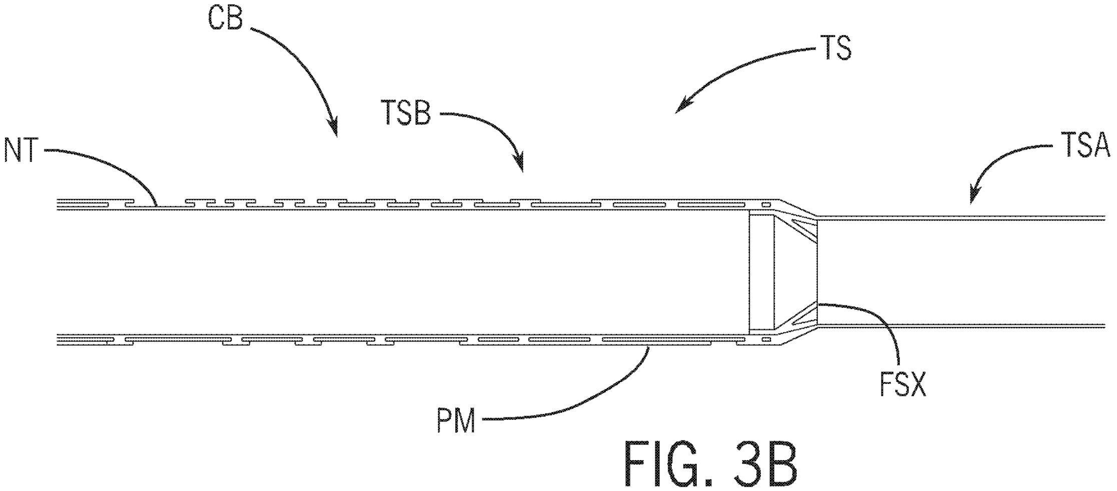
Figure 4A:
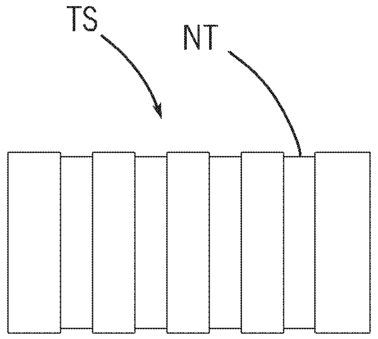
FIG. 4A is a schematic elevation view of a structure for a component according to an exemplary embodiment.
Figure 4B:
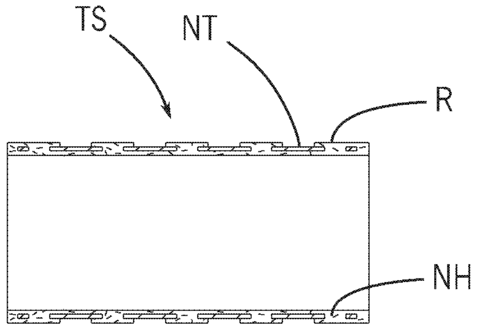
FIG. 4B is a schematic cross-section view of a structure for a component according to an exemplary embodiment.
Figure 4C:
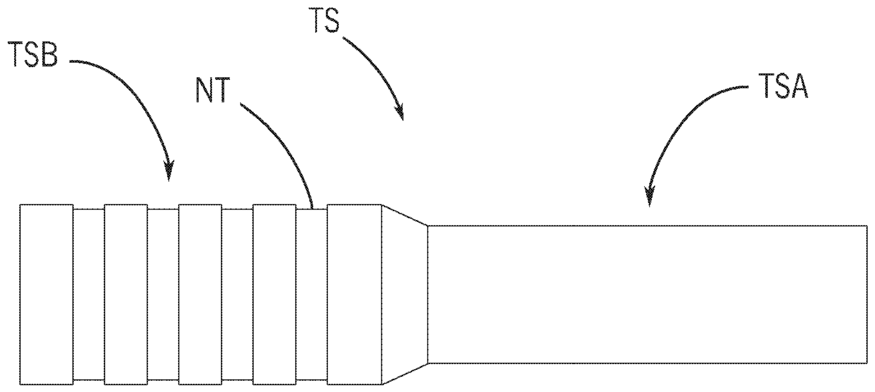
FIG. 4C is a schematic side elevation view of a structure for a component according to an exemplary embodiment.
Figure 4D:
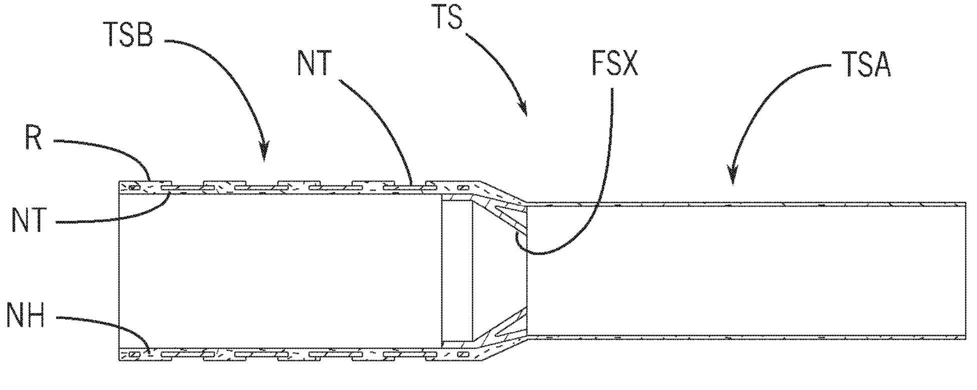
FIG. 4D is a schematic cross-section view of a structure for a component according to an exemplary embodiment.
Figure 5:
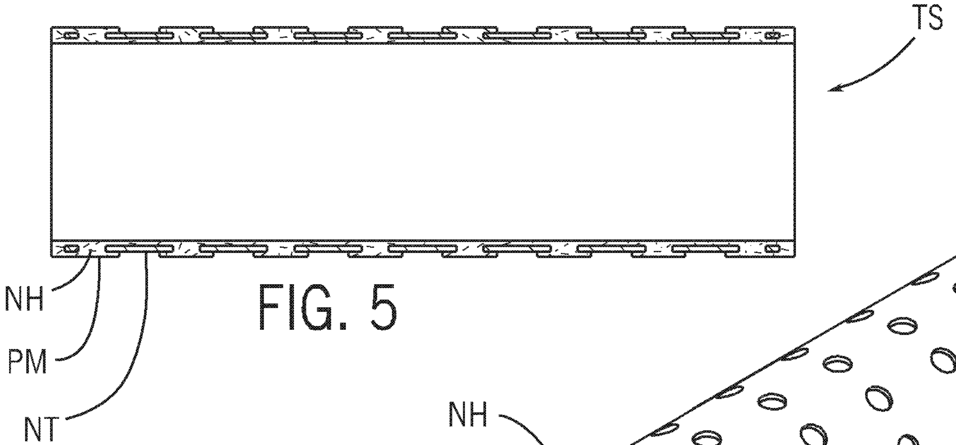
FIG. 5 is a schematic cross-section view of a structure for a component according to an exemplary embodiment.
Figure 5A:
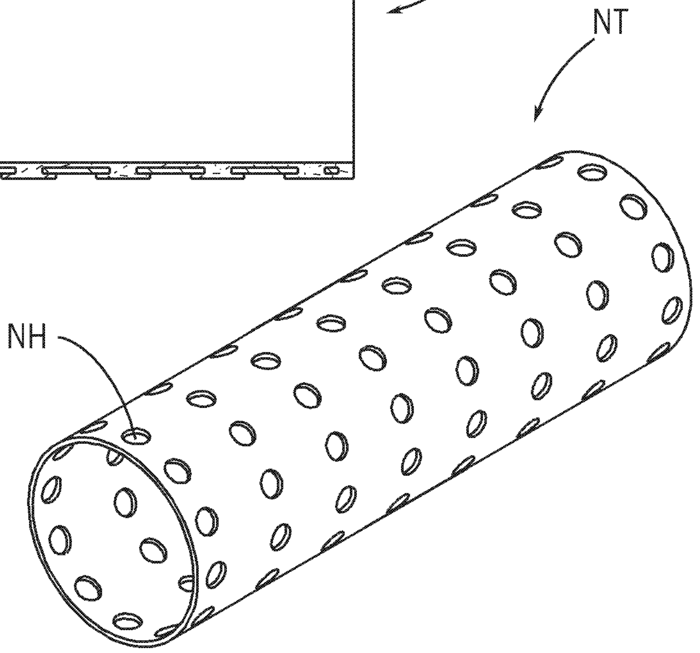
FIG. 5A is a schematic perspective view of an insert for a structure for a component according to an exemplary embodiment.
Figure 5B:
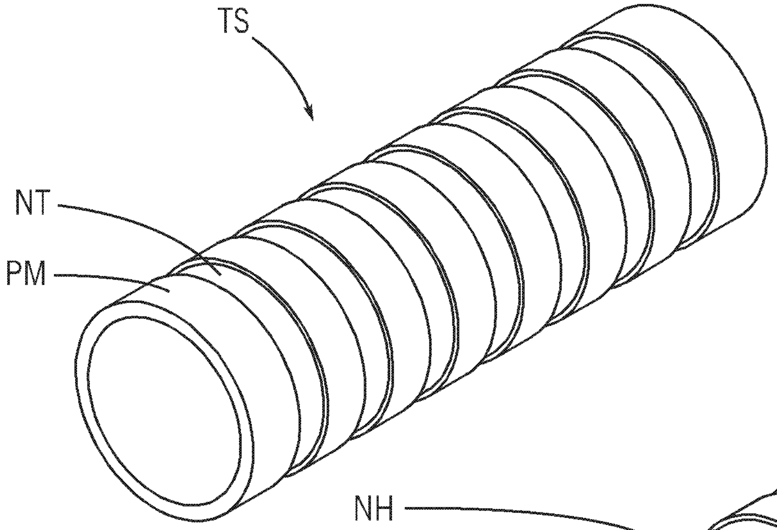
FIG. 5B is a schematic perspective view of a structure for a component according to an exemplary embodiment.
Figure 5C:
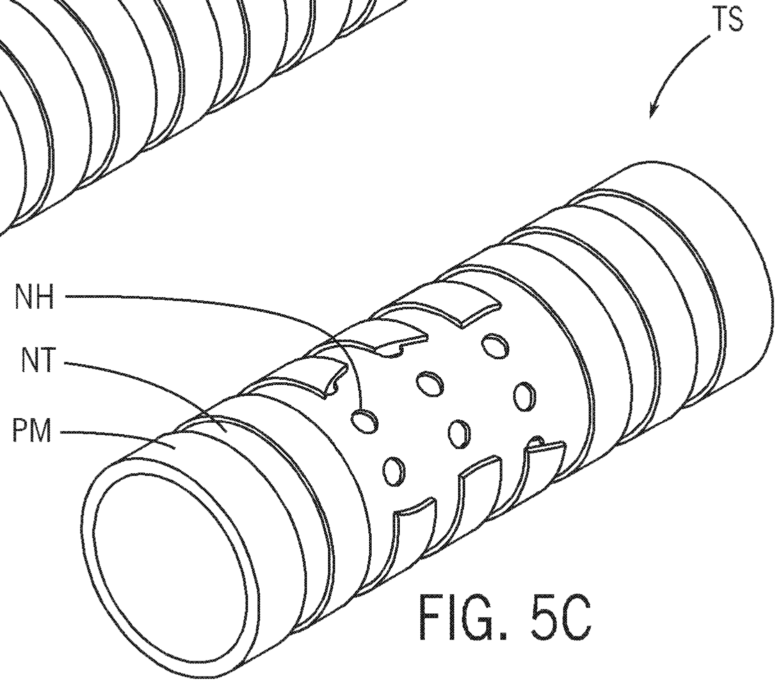
FIG. 5C is a schematic cut-away perspective view of a structure for a component according to an exemplary embodiment.
Figure 6:
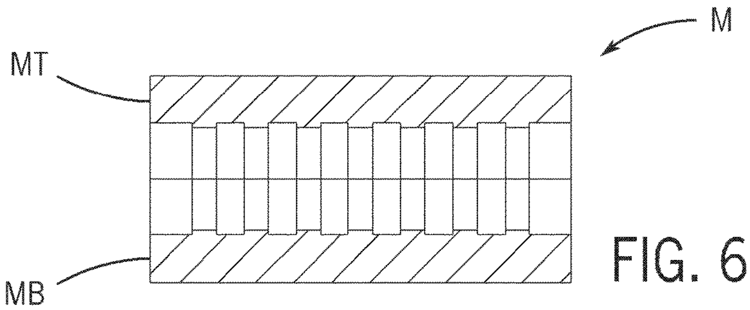
FIG. 6 is a schematic cross-section view of a mold tool for producing a structure for a component according to an exemplary embodiment.
Figure 6A:
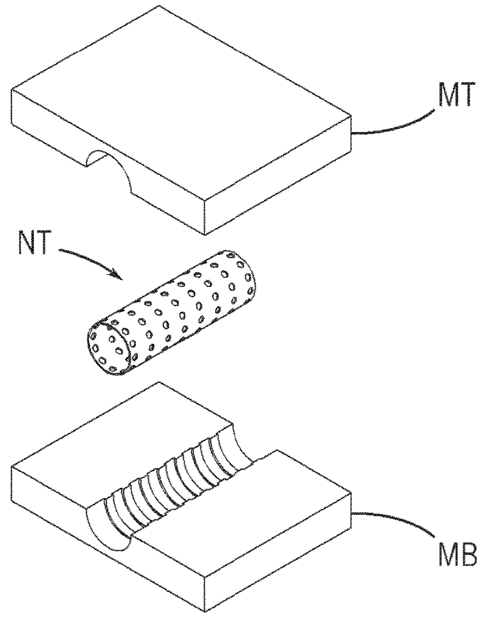
FIGS. 6A through 6C are schematic perspective views of a mold tool for producing a structure for a component according to an exemplary embodiment.
Figure 6B:
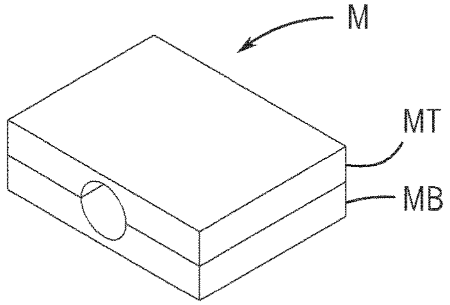
Figure 6C:
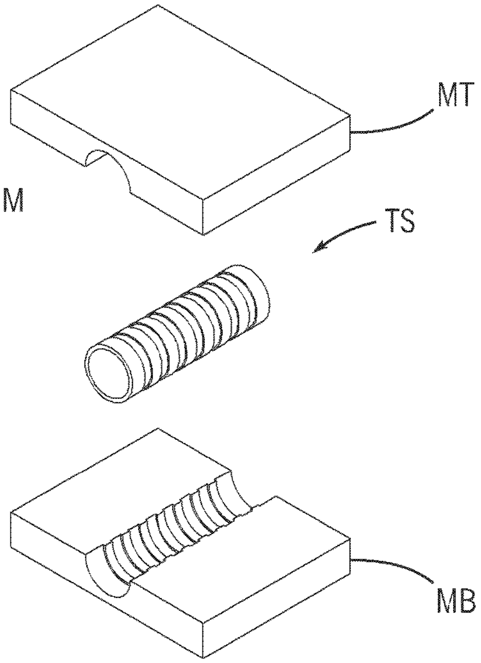
Figure 6D:
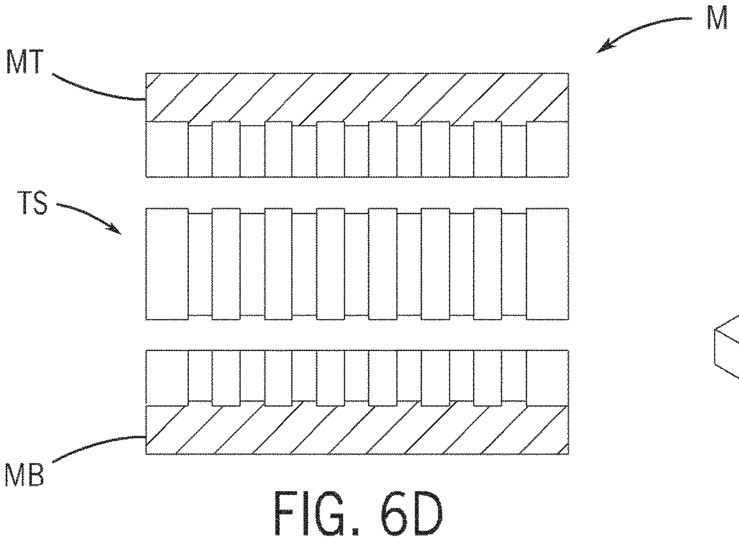
FIG. 6D is a schematic cross-section view of a mold tool and a structure for a component according to an exemplary embodiment.
Figure 7A:
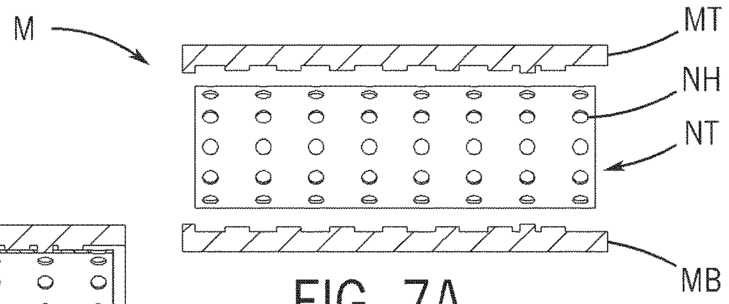
FIGS. 7A through 7H are schematic cross-section views of a method of using a mold tool for producing a structure for a component according to an exemplary embodiment.
Figure 7B:
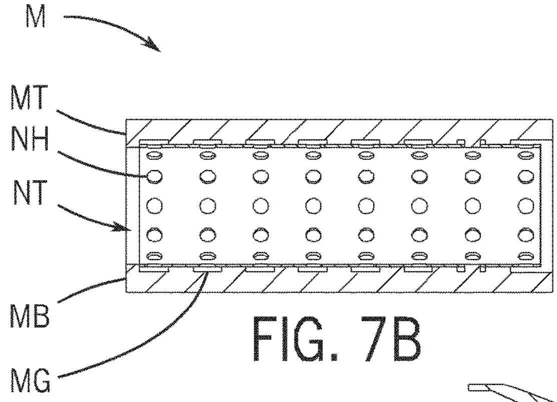
Figure 7C:
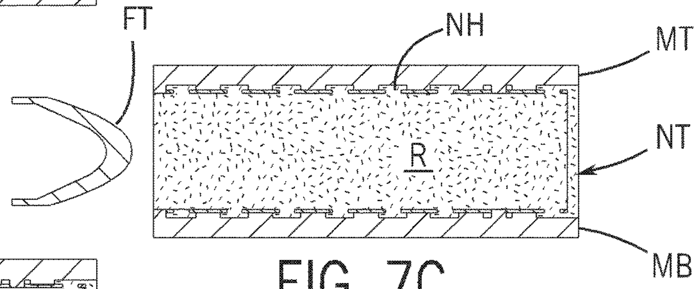
Figure 7D:
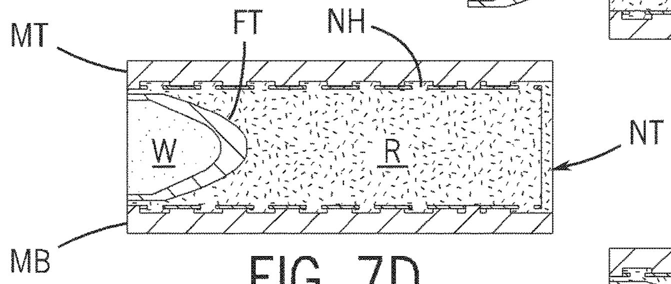
Figure 7E:
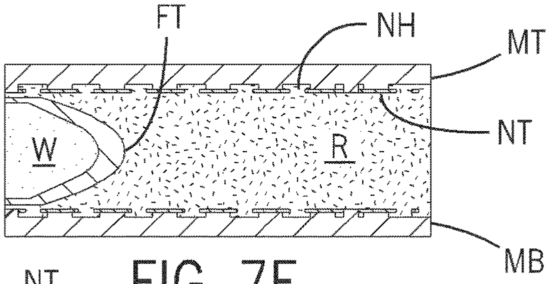
Figure 7F:
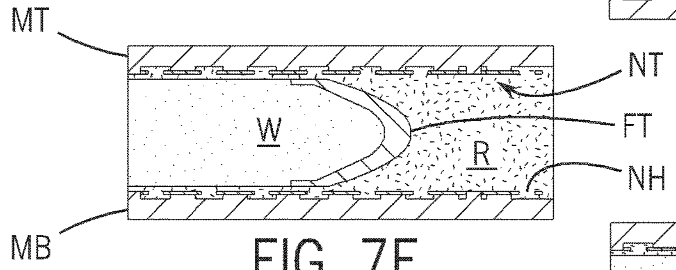
Figure 7G:
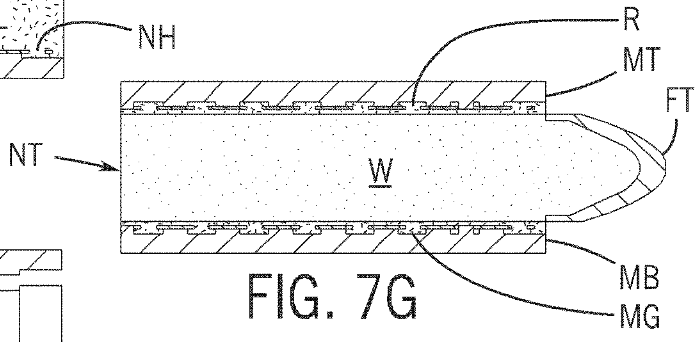
Figure 7H:
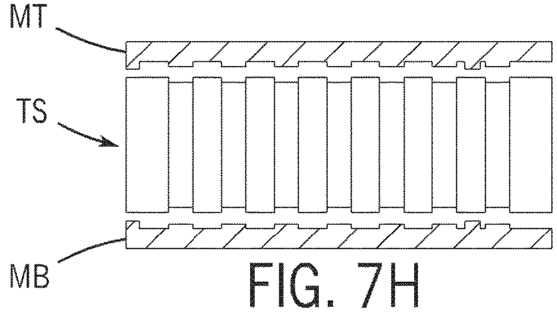
Figure 8:
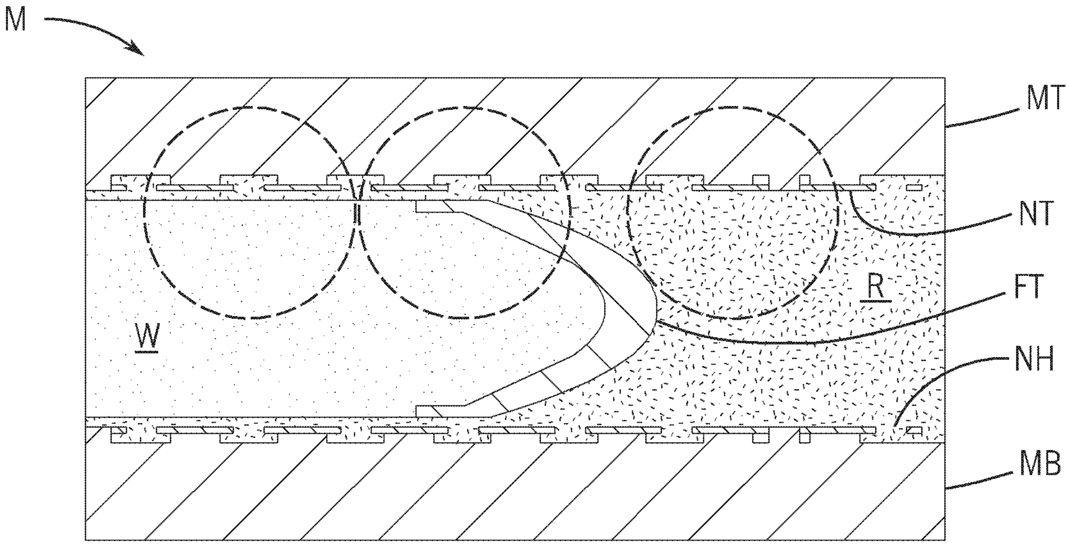
FIG. 8 is a schematic cross-section view of a method of using a mold tool with a projectile element for producing a structure for a component according to an exemplary embodiment.
Figure 8A:
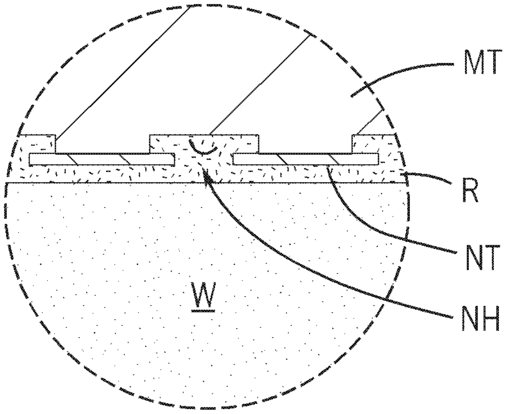
FIGS. 8A through 8C are schematic detail cross-section views of a method of using a mold tool with a projectile element for producing a structure for a component according to an exemplary embodiment.
Figure 8B:
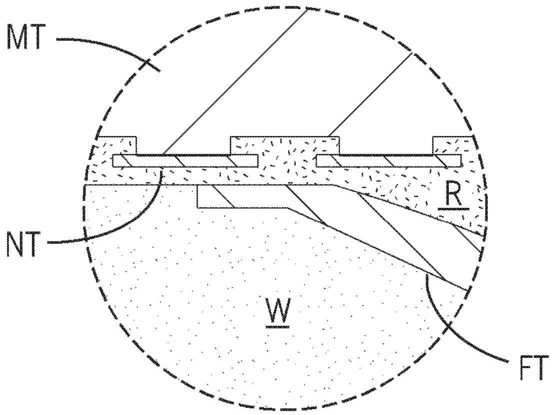
Figure 8C:
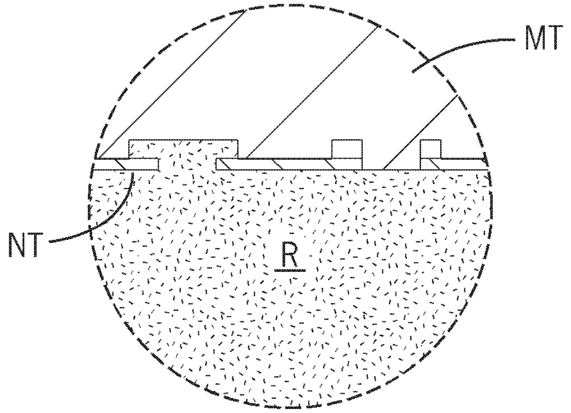
Figure 9A:
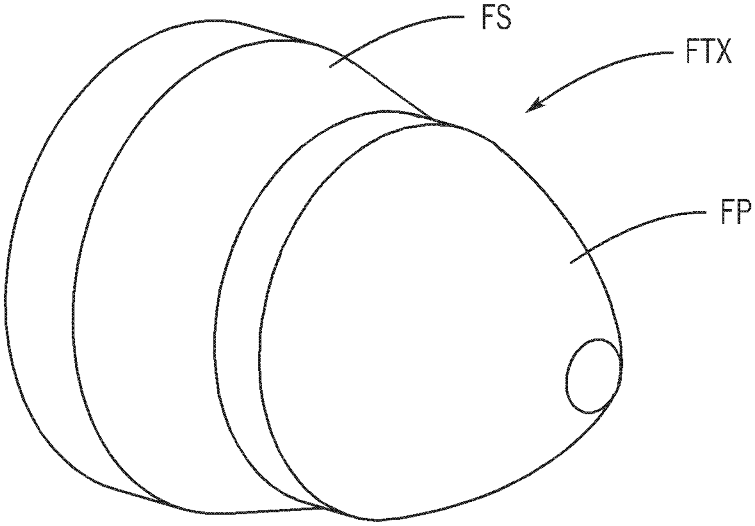
FIGS. 9A through 9C are schematic perspective views of a projectile element of a tool for producing a structure for a component according to an exemplary embodiment.
Figure 9B:
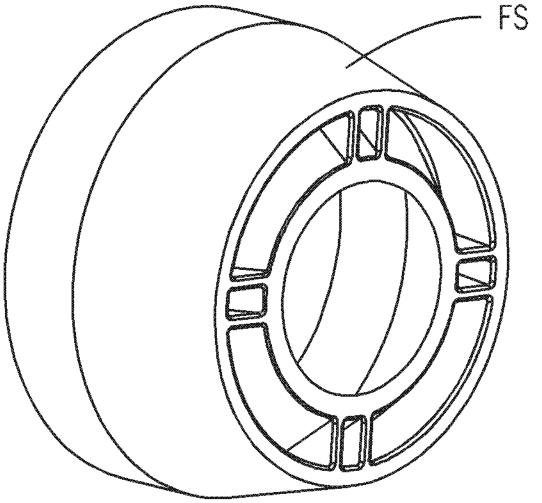
Figure 9C:
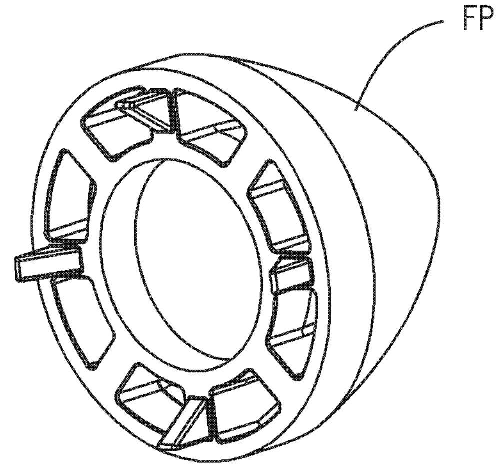
Figure 10A:
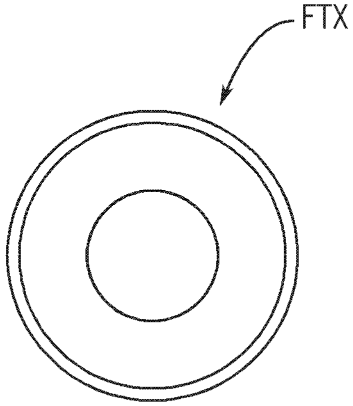
FIGS. 10A through 10C are schematic cross-section views of a projectile element of a tool for producing a structure for a component according to an exemplary embodiment.
Figure 10B:
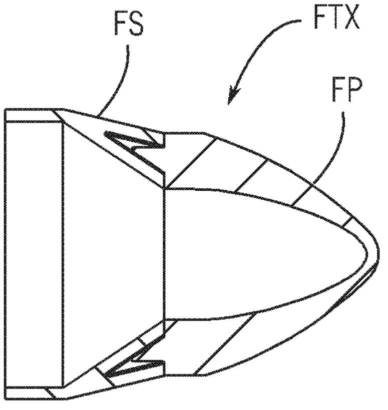
Figure 10C:
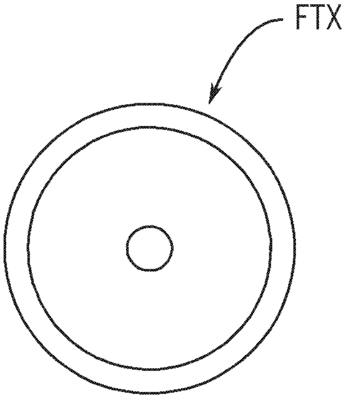
Figure 11A:
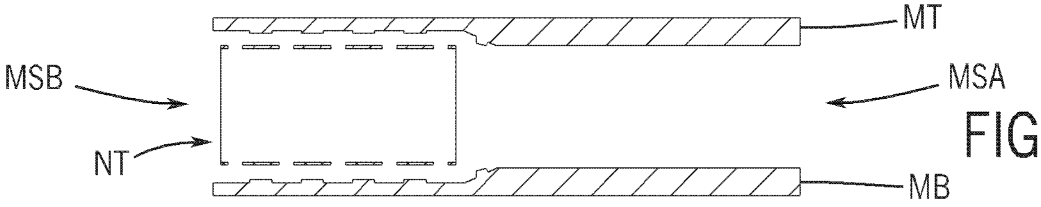
FIGS. 11A through 11H are schematic cross-section views of a method of using a mold tool for producing a structure for a component according to an exemplary embodiment.
Figure 11B:
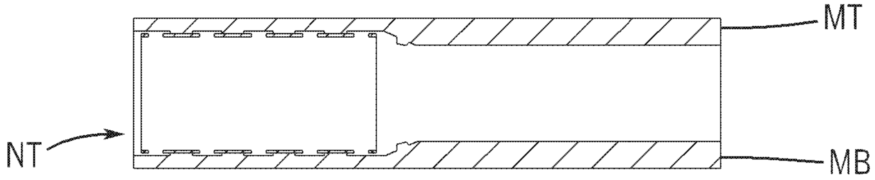
Figure 11C:
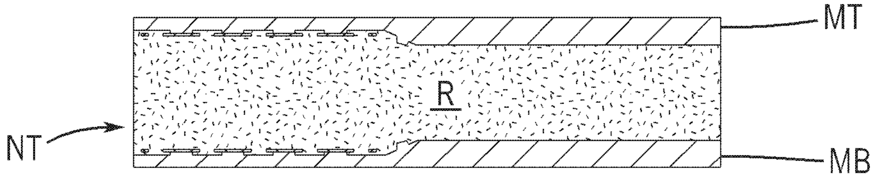
Figure 11D:
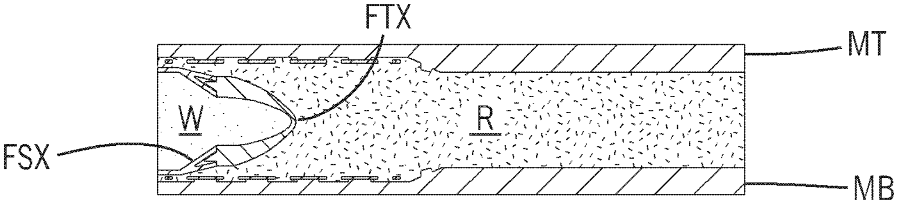
Figure 11E:
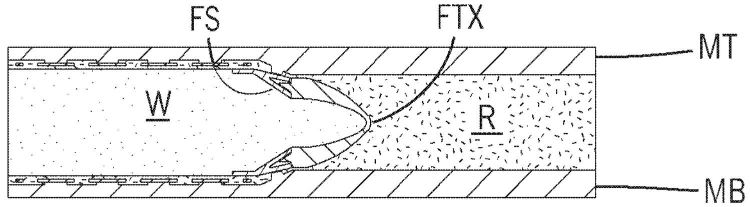
Figure 11F:
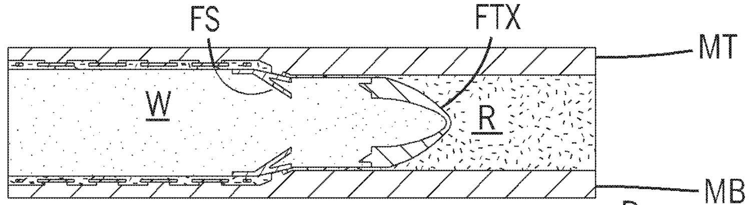
Figure 11G:
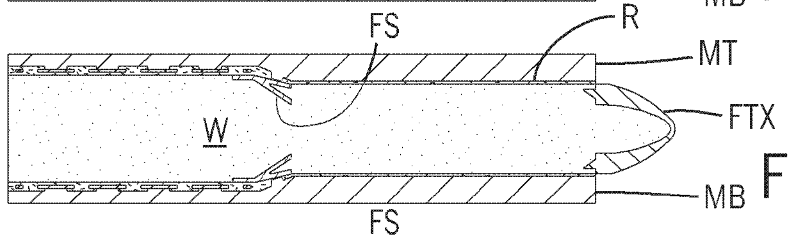
Figure 11H:
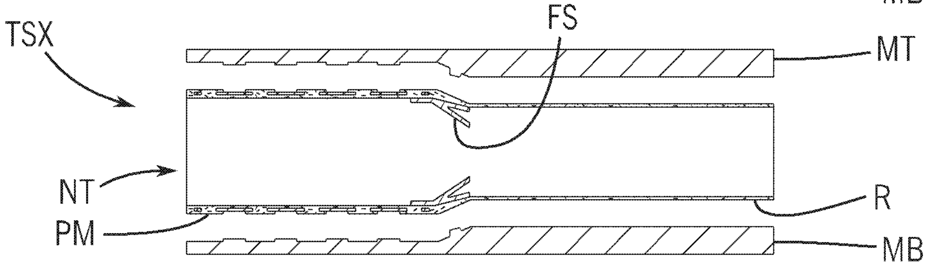
Figure 12A:
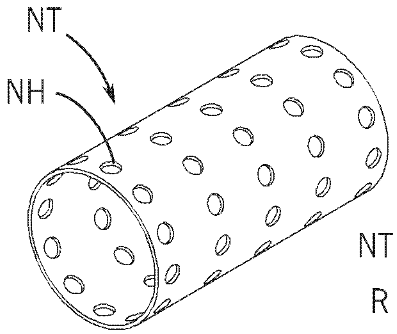
FIG. 12A is a schematic perspective view of an insert for a structure for a component according to an exemplary embodiment.
Figure 12B:
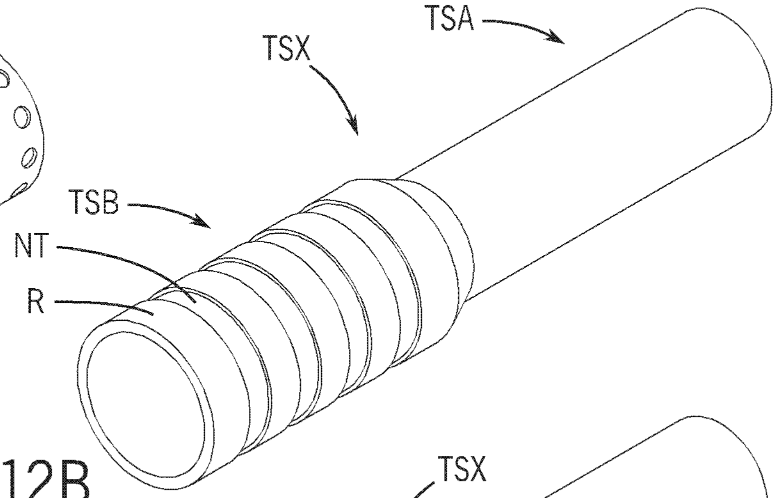
FIG. 12B is a schematic perspective view of a structure for a component according to an exemplary embodiment.
Figure 12C:
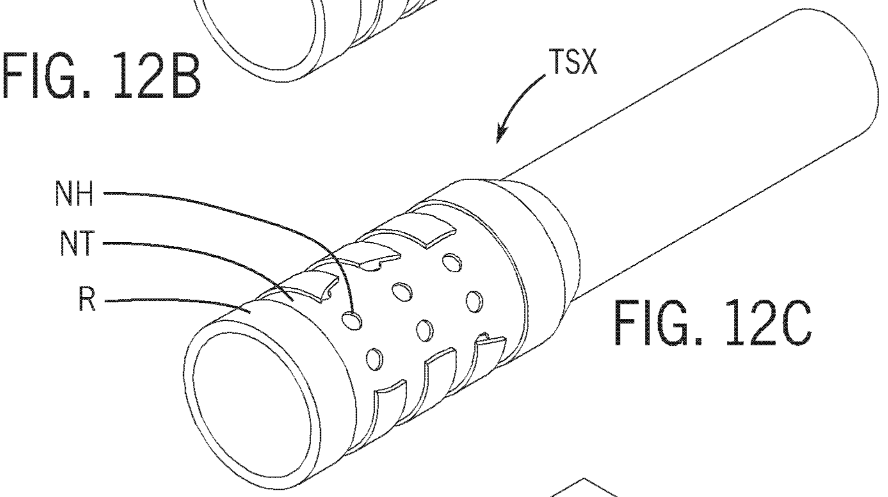
FIG. 12C is a schematic cut-away perspective view of a structure for a component according to an exemplary embodiment.
Figure 13A:
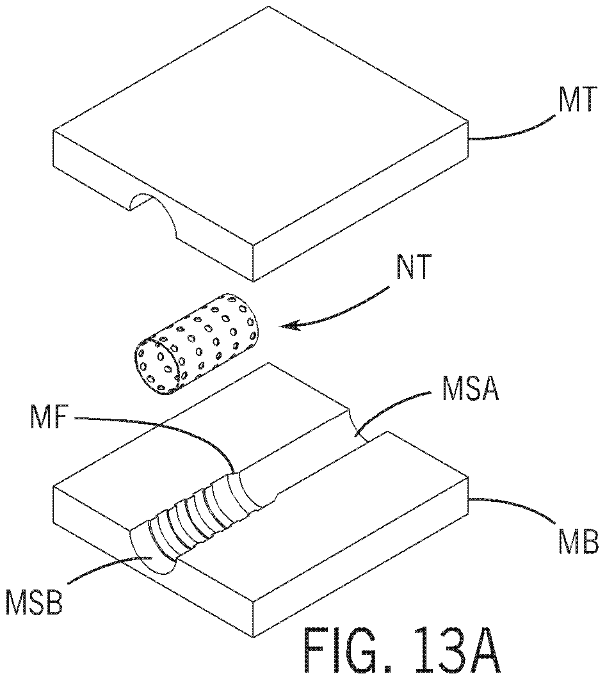
FIGS. 13A and 13B are schematic perspective views of a mold tool for producing a structure for a component according to an exemplary embodiment.
Figure 13B:
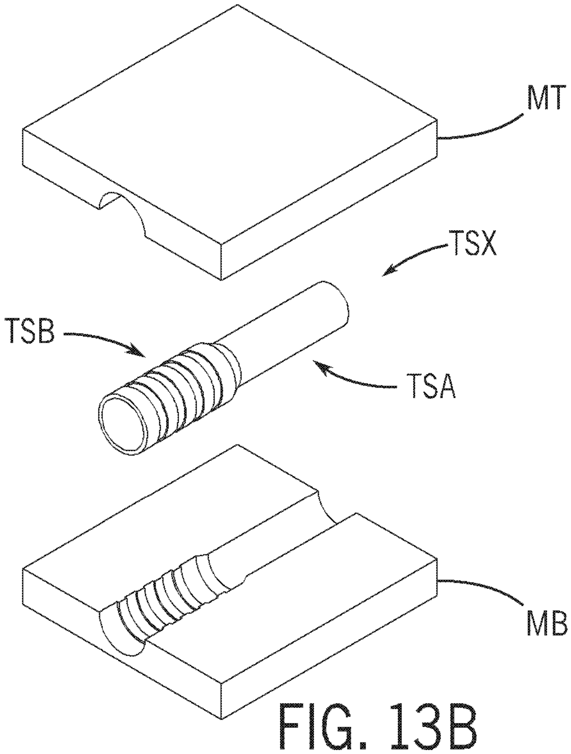
Figure 14A:
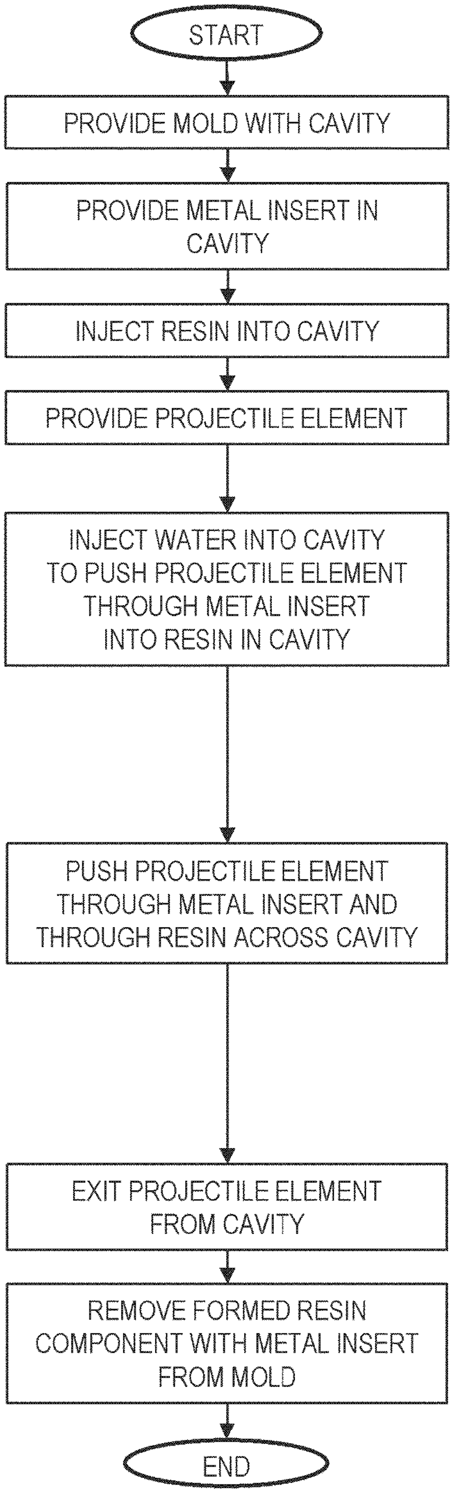
FIGS. 14A through 14C are schematic flow diagrams of a method of using a mold tool for producing a structure for a component according to an exemplary embodiment.
Figure 14B:
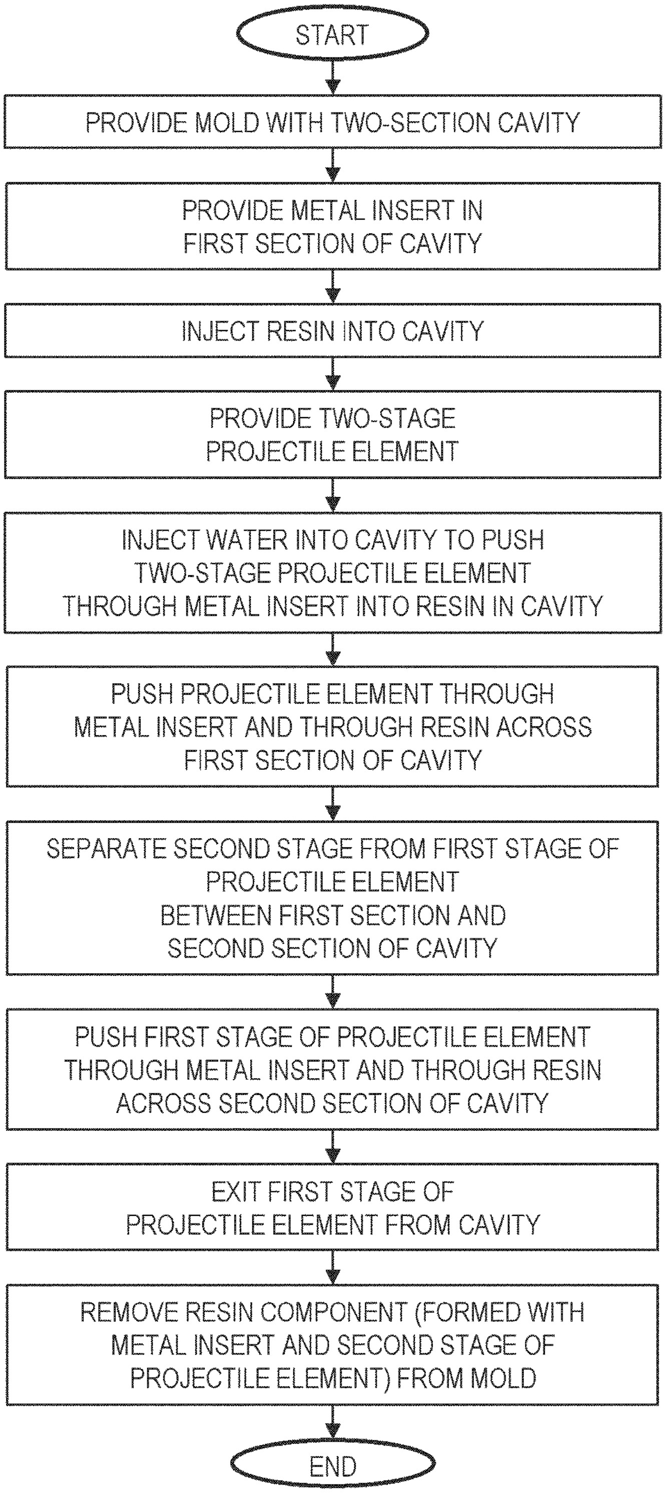
Figure 14C:
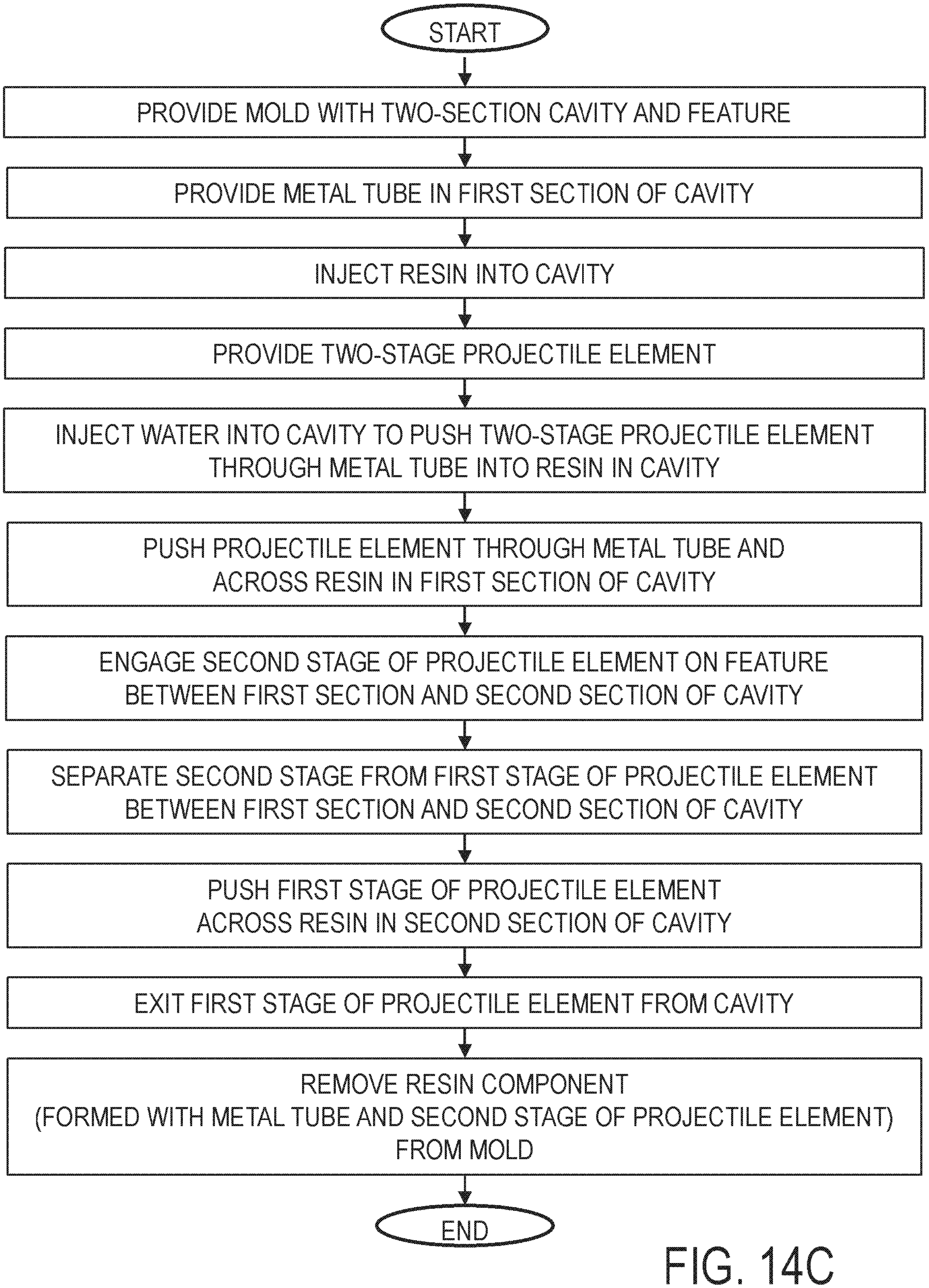

According to an exemplary embodiment as shown schematically in FIGS. 1A and 1B, a vehicle V with an interior I may provide interior components such as an instrument panel IP and cross-beam CB. According to an exemplary embodiment as shown schematically in FIGS. 2 and 3, component C shown as cross-beam CB may comprise a structure TS comprising a molded form of a material shown as plastic/resin material R/PM. See also FIGS. 4A-4D, 5, 5A-5C and 12A-12C.

As shown in FIGS. 4A-4B, 5 and 5A-5C, structure TS may comprise a structure with an insert shown as metal insert NT (with holes NH) and a resin/plastic material R/PM; structure TS may comprise an open structure shown as a generally tubular structure. As shown in FIGS. 3, 3A-3B, 4C-4D and 12A-12C, structure TS/TSX may comprise a multi-section structure with a first section TSB and a second section TSA and a transition section shown as comprising an element FSX.

According to an exemplary embodiment as shown schematically in FIGS. 6, 6A-6D and 7A-7H, structure TS may be formed in a mold tool M comprising a mold top MT and a mold bottom MB. See also FIGS. 11A-11H and 13A-13B. According to an exemplary embodiment as shown schematically in FIGS. 11A-11H and 13A-13B, mold tool M may comprise a multi-section mold with a first mold cavity section MSB and a second mold cavity section MSA configured to form a multi-section structure TS/TSX with first section TSB and second section TSA.

According to an exemplary embodiment as shown schematically in FIGS. 7A-7H, 8, 8A-8C, 9A-9C and 10A-10C, structure TS may be formed in mold tool M with a tool shown as projectile element FT; as shown schematically in FIGS. 9A-9C and 10A-10C, projectile element FT may comprise a multi-stage projectile with a front stage FP and a base stage FS. See also FIGS. 11A-11H. According to an exemplary embodiment as shown schematically in FIGS.

11A-11H, multi-section structure TS may be formed in multi-section mold tool M with the tool shown as projectile element FT.

According to an exemplary embodiment as shown schematically in FIGS. 7A-7H, 11A-11H and 14A-14C, a method of producing structure TS of component C/CB may comprise the forming with a resin material R and insert NT in an injection molding operation. See also FIGS. 2, 3, 5A-5C, 6, 6A-6D, 12A-12C and 13A-13B.

According to an exemplary embodiment as shown schematically in FIGS. 7A-7H, 8, 8A-8C and 14A-14C, a method of producing a structure TS with an insert NT for a component C/CB for a vehicle interior in a mold comprising a cavity using a projectile element FT may comprise the steps of providing the mold with the cavity; providing insert NT in the cavity; providing resin R into the cavity; providing projectile element FT at the cavity; providing water W into the cavity to push projectile element FT through insert NT into resin R in the cavity; pushing projectile element FT through insert NT and through resin R across the cavity; exiting projectile element FT from the cavity. See also FIGS. 6, 6A-6D, 11A-11H, 12A-12C and 13A-13B.

According to an exemplary embodiment as shown schematically in FIGS. 4A-4B, 5 and 5A-5C, structure TS may comprise insert NT and molded resin R; insert NT may comprise a metal insert NT; the component may comprise a formed resin component with metal insert NT from the mold; structure TS may comprise a tube; insert NT may comprise a pipe or tube; insert NT may comprise a metal tube. See also FIGS. 4C-4D and 12A-12C. According to an exemplary embodiment as shown schematically in FIGS. 5A-5C and 12A-12C, insert NT may comprise a set of holes NH; insert NT may comprise an axial opening and a radial set of holes NH.

According to an exemplary embodiment as shown schematically in FIGS. 7A-7H, 11A-11H and 14A-14C, the step of providing resin R may comprise injecting resin R as a liquid; the step of providing water may comprise injecting water W; the step of injecting water may comprise supplying water W from a nozzle.

According to an exemplary embodiment as shown schematically in FIGS. 2, 3, 3A-3B, 4C-4D and 12A-12C, the component may comprise a multi-section component C/CB with a structure TS comprising a first section TSB and a second section TSA; insert NT may be provided in first section TSB of the component; first section TSB of the component may have an inner diameter larger than an inner diameter of the second section TSA of the component. See also FIGS. 13A-13B.

According to an exemplary embodiment as shown schematically in FIGS. 11A-11H and 14A-14C, a method of producing a structure TS with an insert NT for a component C/CB for a vehicle interior in a multi-section mold comprising a cavity with a first cavity section MSB and a second cavity section MSA using a multi-stage projectile element FT with a front stage FP and a base stage FS may comprise the steps of providing the mold with a multi-section cavity; providing insert NT in first cavity section MSB of the cavity; providing resin R into the cavity; providing multi-stage projectile element FT; providing water W into the cavity to push multi-stage projectile element FT through insert NT into resin R in the cavity; pushing projectile element FT through insert NT and through resin R across first cavity section MSB of the cavity; separating base stage FS of projectile element FT from front stage FP of projectile element FT between first cavity section MSB of the cavity and second cavity section MSA of the cavity; pushing front stage FP of projectile element FT through insert NT and through resin R across second cavity section MSA of the cavity; exiting front stage FP of projectile element FT from the cavity.

According to an exemplary embodiment as shown schematically in FIGS. 11A-11H and 14C, front stage FP of projectile element FT may be separated from base stage FS of projectile element FT between first cavity section MSB of the cavity and second cavity section MSA of the cavity. See also FIGS. 9A-9C and 10A-10C. According to an exemplary embodiment as shown schematically in FIGS. 4C-4D, 11A-11H, 12A-12C and 13A-13B, the component may comprise a resin component; the component may comprise a resin component formed with insert NT; the component may comprise a resin component formed with base stage FS of projectile element FT. See also FIGS. 14B-14C. According to an exemplary embodiment as shown schematically in FIGS. 2, 3, 4C-4D and 12A-12C, the component may comprise a multi-section component comprising a first section TSB and a second section TSA; the component may comprise a resin component formed with base stage FS/FSX of projectile element FT/FTX between first section TSB of the component and second section TSA of the component.

According to an exemplary embodiment as shown schematically in FIGS. 11A-11H and 13A-13B, the method may comprise the step of removing a resin component from the mold; the method may comprise the step of removing a resin component formed with insert NT from the mold; the method may comprise the step of removing a resin component formed with base stage FS of projectile element FT from the mold; the method may comprise the step of removing a resin component formed with metal insert NT and base stage FS of projectile element FT from the mold. Insert NT may comprise a metal insert NT.

According to an exemplary embodiment as shown schematically in FIGS. 11A-11H, the step of separating base stage FS of projectile element FT from front stage FP of projectile element FT may comprise engagement of projectile element FT with a mold feature; the mold feature may be between first cavity section MSB of the cavity and second cavity section MSA of the cavity. According to an exemplary embodiment as shown schematically in FIGS. 12A-12C and 13A-13B, structure TS may comprise a tube; insert NT may comprise a pipe; insert NT may comprise a tube; insert NT may comprise a metal tube. According to an exemplary embodiment as shown schematically in FIGS. 12A-12C, insert NT may comprise a set of holes NH; insert NT may comprise an axial opening and a radial set of holes NH. According to an exemplary embodiment as shown schematically in FIGS. 11A-11H, the step of providing resin R may comprise injecting resin R as a liquid; the step of providing water may comprise injecting water W; the step of injecting water may comprise supplying water W from a nozzle.

According to an exemplary embodiment as shown schematically in FIGS. 4A-4B, 5, 5A-5C, 6 and 6A-6D, a structure TS for a component C/CB for a vehicle interior may be produced by a method in a mold M with a projectile element FT. See also FIGS. 7A-7H and 14A. Structure TS may be formed from a resin material R; structure TS may comprise a central opening formed by projectile element FT.

According to an exemplary embodiment as shown schematically in FIGS. 2, 3, 4C-4D, 12A-12C and 13A-13B, a structure TS/TSX comprising a first section TSB and a second section TSA for component C/CB for a vehicle interior may be produced in a mold M with a projectile element FT/FTX. Structure TS may be formed from a resin material R; structure TS/TSX may comprise a central opening formed by projectile element FT/FTX. According to an exemplary embodiment as shown schematically in FIGS. 4C-4D and 12A-12B, in structure TS/TSX a cross-section area of first section TSB may be larger than a cross-section area of second section TSA; structure TS/TSX may comprise a transition section with separated base stage element FSX from projectile element FT/FTX between first section TSB and second section TSA.

According to an exemplary embodiment as shown schematically in FIGS. 4A-4D, 5, 5A-5C, 6, 6A-6D, 12A-12C and 13A-13B, the central opening of structure TS/TSX may comprise an axial opening. Structure TS may comprise a tube structure; structure TS may comprise an insert NT; structure TS may comprise a section of a beam. The beam may comprise a cross-car beam comprising structure TS. See FIGS. 2 and 3.

According to an exemplary embodiment as shown schematically in FIGS. 7A-7H, 8, 8A-8C and 11A-11H, structure TS/TSX may be formed by pushing projectile element FT/FTX through a cavity in a mold M containing resin material R. Structure TS may be formed by injecting water W to push projectile element FT through a cavity in a mold containing resin material R. Water and resin material R may be separated by projectile element FT. Projectile element FT may comprise a perimeter surface; water W and resin material R may be in contact adjacent the perimeter surface. Resin material R may be provided at the perimeter surface of structure TS. Component C/CB may comprise a formed resin component. As indicated schematically in FIGS. 9A-9C and 10A-10C, projectile element FT may comprise a multi-stage element; the multi-stage element may comprise a front stage FP and a base stage FS; base stage FS may be detachable from front stage FP. As indicated schematically in FIGS. 4C-4D, structure TS may comprise base stage FSX of projectile element FT; structure TS may comprise base stage FS of projectile element FT between first section TSB and second section TSA; structure TS may be formed with base stage FS of projectile element FT between first section TSB and second section TSA. As indicated schematically in FIGS. 6, 6A-6D, 7A-7H, 11A-11H and 13A-13H, structure TS may be formed in a mold tool M. As indicated schematically in FIGS. 4C-4D, 11A-11H, 12A-12C and 13A-13B, mold tool M may comprise a first cavity section MSB and a second cavity section MSA; first section TSB of structure TS may be formed in first cavity section MSB of mold tool M and second section TSA of structure TS may be formed in second cavity section MSA of mold tool M; structure TS may comprise a first section TSB and a second section TSA; first section TSB may comprise a first cross-section area; second section TSA may comprise a second cross-section area. The second cross-section area may be greater than the first cross-section area; first section TSB may comprise a first diameter; second section TSA may comprise a second diameter; the second diameter may be greater than the first diameter; structure TS may comprise a tube structure TS. The component may comprise a cross-car beam.

According to an exemplary embodiment as shown schematically in FIGS. 6, 6A-6D, 7A-7H and 14A, a component C/CB for a vehicle interior comprising an insert NT may be produced by a method in a mold comprising a cavity using a projectile element FT; the method may comprise the steps of providing the mold with the cavity; providing insert NT in the cavity; providing resin R into the cavity; providing projectile element FT at the cavity; providing water W into the cavity to push projectile element FT through insert NT into resin R in the cavity; pushing projectile element FT through insert NT and through resin R across the cavity; exiting projectile element FT from the cavity. See also FIGS. 11A-11H and 14B-14C.

According to an exemplary embodiment as shown schematically in FIGS. 11A-11H, 12A-12C, 13A-13B and 14B-14C, a component C/CB for a vehicle interior comprising an insert NT and a multi-section structure TS comprising a first section TSB and a second section TSA may be produced by a method in a mold comprising a multi-section cavity with a first cavity section MSB and a second cavity section MSA using a multi-stage projectile element FT/FTX with a front stage FP and a base stage FS/FSX; the method may comprise the steps of providing the mold with the multi-section cavity; providing insert NT in first cavity section MSB of the cavity; providing resin R into the cavity; providing multi-stage projectile element FT/FTX; providing water W into the cavity to push multi-stage projectile element FT/FTX through insert NT into resin R in the cavity; pushing projectile element FT/FTX through insert NT and through resin R across first cavity section MSB of the cavity; separating base stage FS/FSX of projectile element FT/FTX from front stage FP of projectile element FT/FTX between first cavity section MSB of the cavity and second cavity section MSA of the cavity; pushing front stage FP of projectile element FT/FTX through insert NT and through resin R across second cavity section MSA of the cavity; exiting front stage FP of the projectile element FT/FTX from the cavity.

According to an exemplary embodiment as shown schematically in FIGS. 9A-9C, 10A-10C and 11A-11H, multi-stage projectile element FT/FTX may comprise a two-stage projectile element FT/FTX. According to an exemplary embodiment as shown schematically in FIGS. 11A-11H and 13A-13B, the multi-section cavity may comprise a two-stage cavity. According to an exemplary embodiment as shown schematically in FIGS. 2, 3, 4C-4D, 12A-12C and 13A-13B, multi-section structure TS may comprise a two-section structure TS; two-section structure TS may comprise a transition section between first section TSB and second section TSA. According to an exemplary embodiment as shown schematically in FIGS. 4C-4D and 12A-12C, multi-section structure TS may comprise a transition section (e.g. step, ramp, etc.) between first section TSB and second section TSA.

According to an exemplary embodiment as shown schematically in FIGS. 9A-9C, 10A-10C and 11A-11H, a tool may be configured for use in a method of producing a resin-formed structure TS for a component C/CB for a vehicle interior in a multi-section mold with a cavity having first cavity section MSB and a second cavity section MSA; the tool may comprise a projectile element FT/FTX comprising a front stage FP and a base stage FS/FSX; base stage FS/FSX may be attachable to front stage FP for entry into first cavity section MSB of the cavity of the mold and detachable from front stage FP before second cavity section MSA of the cavity of the mold; so that resin-formed structure TS for the component formed in the mold may comprise base stage FS/FSX.

According to an exemplary embodiment as shown schematically in FIGS. 11A-11H and 14A-14C, the method may comprise the steps of providing the mold with the cavity; providing an insert NT in the cavity; providing resin R into the cavity; providing projectile element FT/FTX at the cavity; providing water W into the cavity to push projectile element FT/FTX through insert NT into resin R in the cavity; pushing projectile element FT/FTX through insert NT and through resin R across the cavity; exiting projectile element FT/FTX from the cavity.

According to an exemplary embodiment as shown schematically in FIGS. 4C-4D and 12A-12C, base stage FS/FSX of projectile element FT/FTX may comprise an outer diameter larger than an outer diameter of front stage FP of projectile element FT/FTX.

According to an exemplary embodiment as shown schematically in FIGS. 11A-11H and 14B-14C, the method may comprise the step of separating base stage FS/FSX of projectile element FT/FTX between first cavity section MSB of the cavity and second cavity section MSA of the cavity. According to an exemplary embodiment as shown schematically in FIGS. 11A-11H, the mold may comprise a mold feature; the step of separating base stage FS/FSX of projectile element FT/FTX between first cavity section MSB of the cavity and second cavity section MSA of the cavity may comprise engaging base stage FS/FSX of projectile element FT/FTX on the mold feature. See also FIGS. 4C-4D, 12A-12C and 13A-13B. As shown schematically according to an exemplary embodiment, the step of separating the front stage of the projectile element from the base stage of the projectile element may comprise engagement of the base stage of the projectile element with a mold feature; the mold feature may comprise a reduction in size of an effective inner diameter between the first section of the cavity and the second section of the cavity.

According to an exemplary embodiment as shown schematically in FIGS. 2, 3, 4C-4D and 12A-12C, resin-formed structure TS may comprise a first section TSB and a second section TSA; the step of separating base stage FS/FSX of projectile element FT/FTX between first cavity section MSB of the cavity and second cavity section MSA of the cavity may comprise engaging base stage FS/FSX of projectile element FT/FTX on the mold feature so that resin-formed structure TS formed in the mold may comprise base stage FS/FSX of projectile element FT/FTX between first section TSB and second section TSA of structure TS. According to an exemplary embodiment as shown schematically in FIGS. 5, 5A-5D and 12A-12C, first section TSB of resin-formed structure TS may comprise insert NT; insert NT may comprise a metal insert NT. See also FIGS. 7A-7H and 11A-11H. According to an exemplary embodiment as shown schematically in FIGS. 11A-11H, the step of pushing projectile element FT/FTX through insert NT and through resin R across the cavity may comprise forming first section TSB of resin-formed structure TS on insert NT and separating base stage FS/FSX of projectile element FT/FTX from front stage FP of projectile element FT/FTX before forming second section TSA of resin-formed structure TS with front stage FP of projectile element FT/FTX.

According to an exemplary embodiment as shown schematically in FIGS. 9A-9C and 10A-10C, projectile element FT/FTX may comprise projections configured (a) to engage in recesses to attach base stage FS/FSX of projectile element FT/FTX to front stage FP of projectile element FT/FTX and (b) to disengage and separate from recesses to detach base stage FS/FSX of projectile element FT/FTX from front stage FP of projectile element FT/FTX; front stage FP of projectile element FT/FTX may comprise projections and base stage FS/FSX of projectile element FT/FTX may comprise recesses for the projections. According to an exemplary embodiment as shown schematically in FIGS. 9A-9C, base stage FS/FSX of projectile element FT/FTX may have a generally frusto-conical shape; front stage FP of projectile element FT/FTX may have a generally conical shape. See also FIGS. 11A-11H.

Exemplary Embodiments—A

Figure 15A:
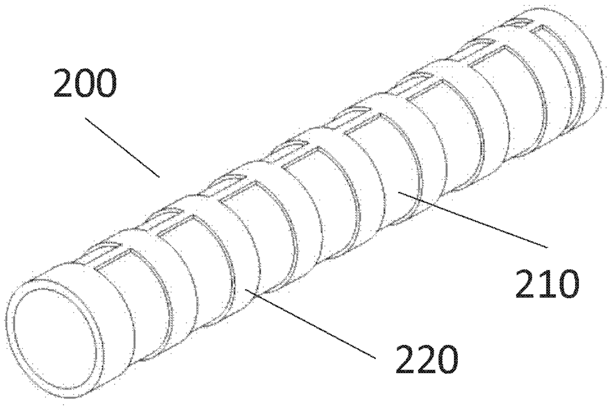
FIG. 15A is a schematic perspective view of a structure for a component according to an exemplary embodiment.
Figure 15B:
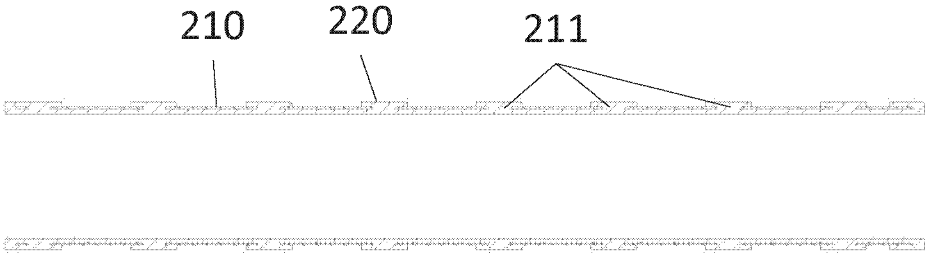
FIG. 15B is a schematic cross-section view of a structure for a component according to an exemplary embodiment.
Figure 15C:
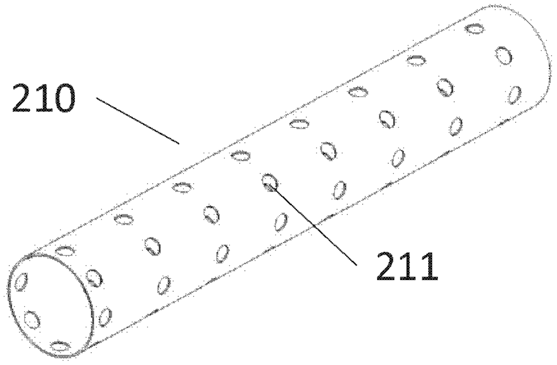
FIG. 15C is a schematic perspective view of an insert for a structure for a component according to an exemplary embodiment.
Figure 16A:
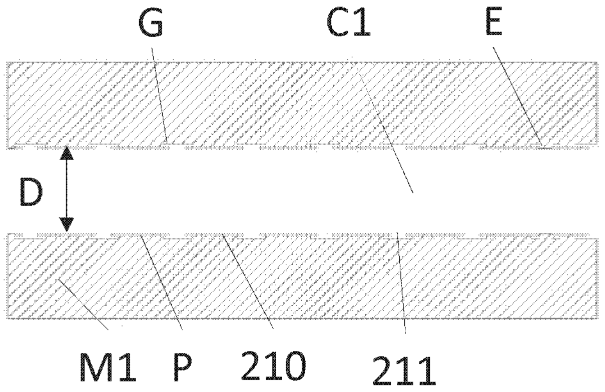
FIGS. 16A through 16E are schematic cross-section views of a method of using a mold tool for producing a structure for a component according to an exemplary embodiment.
Figure 16B:
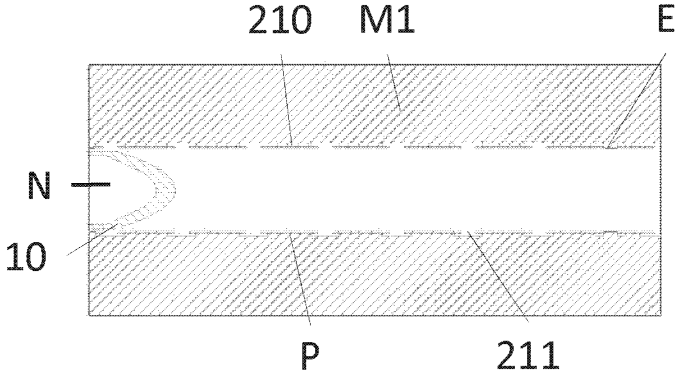
Figure 16C:
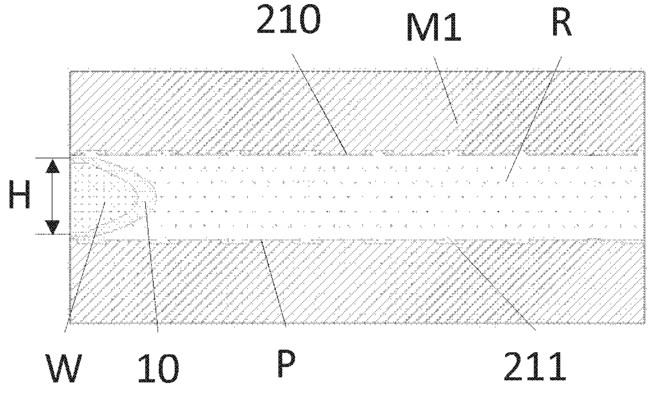
Figure 16D:
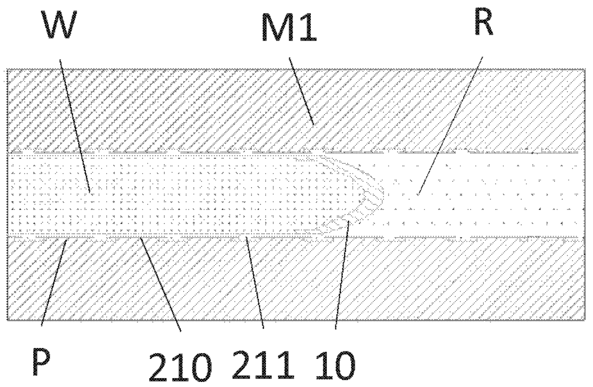
Figure 16E:
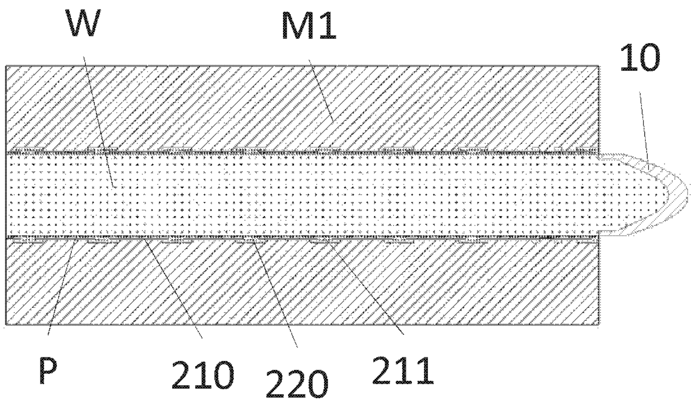

According to an exemplary embodiment shown schematically in FIGS. 1A and 1B, a vehicle V may be provided with an interior I including vehicle interior components such as an instrument panel IP and a floor console. According to an exemplary embodiment, a hybrid beam 200 as shown schematically in FIGS. 17A-17C may be within the instrument panel IP; the hybrid beam 200 may comprise a plastic pipe wall 220 and an insert shown as a metal pipe 210 at least partially embedded within the plastic pipe wall 220. According to an exemplary embodiment, the metal pipe 210 spans the entire length of the hybrid beam 200. The hybrid beam 200 may be lighter in weight than a full metal beam. As shown schematically in FIGS. 15A-15C, inner and outer surfaces of the metal pipe 210 of the hybrid beam 200 are covered with the plastic parts 220, the metal pipe 210 may be between the formed plastic parts 220 (e.g. on inner and outer surfaces); the composite beam structure with metal pipe 210 and plastic material/parts 220 may be formed with relatively firm connection/adhesion to provide higher strength/structural integrity.

According to an exemplary embodiment shown schematically in FIGS. 16A-16E, the insert injection molding method comprise placing a metal pipe 210 in a mold M1; the metal pipe 210 has a uniform inner diameter D. The metal pipe 210 may comprise a plurality of through holes 211. The metal pipe 210 may be fixed in the mold M1 by inserting at least one first positioning rib E on an inner surface of the cavity C1 of the mold M1 into at least one through hole 211 of the metal pipe 210 and by abutting several bosses P on the inner surface of the cavity C1 against a partial outer surface of the metal pipe 210; the plurality of bosses P may be sequentially arranged axially along the metal pipe 210. A first gap G may be formed between the remaining outer surface of the metal pipe 210 not abutted by bosses P and the inner surface of the cavity C1. As shown schematically in FIG. 16B, a tool element shown as projectile 10 may be placed in the mold M1 at one end of the metal pipe 210. One end of the projectile 10 may be closed and may face an opening of the metal pipe M1; the other end of the projectile 10 may be open and connected to a nozzle N on the mold M1. The maximum outer diameter H of the projectile 10 may be smaller than the inner diameter D of the metal pipe 210; the projectile 10 may pass through the metal pipe 210; a second gap may be formed between the projectile 10 and the inner surface of the metal pipe. As shown schematically in FIG. 16A-16E, the mold may be closed; a resin melt may be injected into the mold M1; the resin melt R passes through the holes 211 on the metal pipe 210 to fill the inside of the metal pipe 210 and a gap G between the metal pipe 210 and the inner surface of the cavity C1; the pressure of the resin melt R may be distributed on the inside and outside of the metal pipe 210 (e.g. reducing differential pressure/deformation of the metal pipe 210); resin melt R may not yet be solidified as the nozzle N injects a water flow W into the projectile 10 under pressure, so that the projectile 10 is injected/pushed into the metal pipe 210 and then passes through the metal pipe 210. As shown schematically in FIGS. 16C-16E, as the projectile 10 travels inside the metal pipe 210, the resin melt R at a front end of the projectile 10 may be extruded out of the metal pipe 210 and returned to a melt pool; the resin melt R remains in the gap between the projectile 10 and the inner surface of the metal pipe 110; while the water flow W behind projectile 10 fills the remaining space inside the metal pipe 110 (e.g. to rapidly cool the resin melt R in the second gap between the projectile 10 and the inner surface of the metal pipe 210, the resin melt R in the through holes 211 and the resin melt R in the first gap between the outer surface of the metal pipe 210 and the inner surface of the cavity C1); solidified resin melts R produces the formed plastic pipe wall 220 wrapping the metal pipe 210 (e.g. the plastic pipe wall 220 may comprise the resin melt R between the projectile 10 and the inner surface of the metal pipe 210, the resin melt R in the through hole 211 and the resin melt R outside of the metal pipe 210).

Figure 17A:
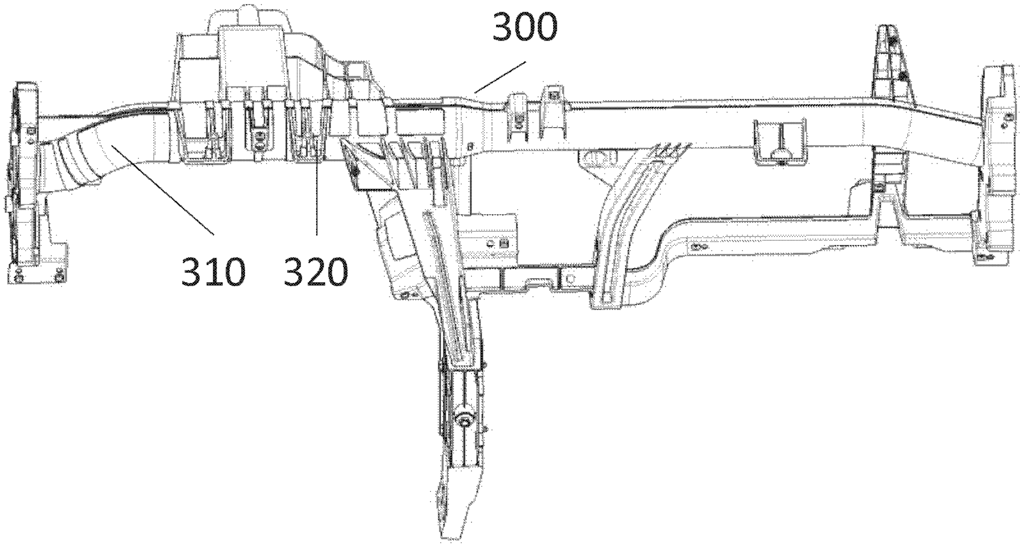
FIG. 17A is a schematic front elevation view of a component shown as a cross-beam with a structure according to an exemplary embodiment.
Figure 17B:
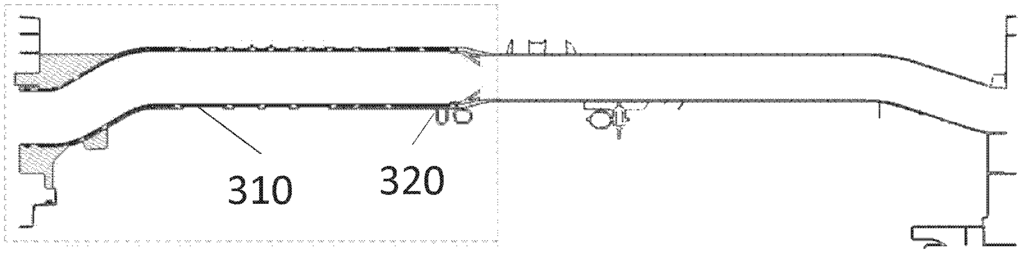
FIGS. 17B and 17C are schematic cross-section views of a component shown as a cross-beam with a structure according to an exemplary embodiment.
Figure 17C:
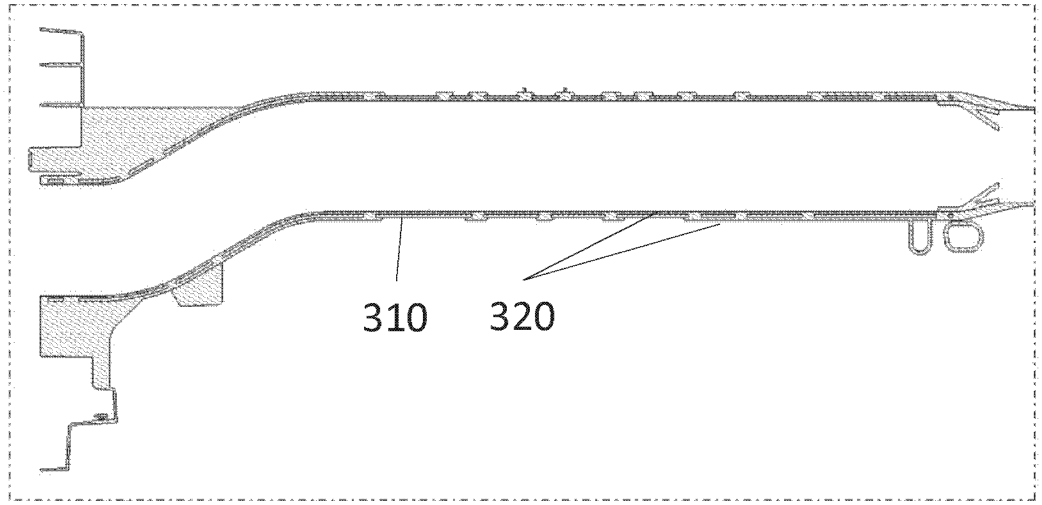
Figure 18A:
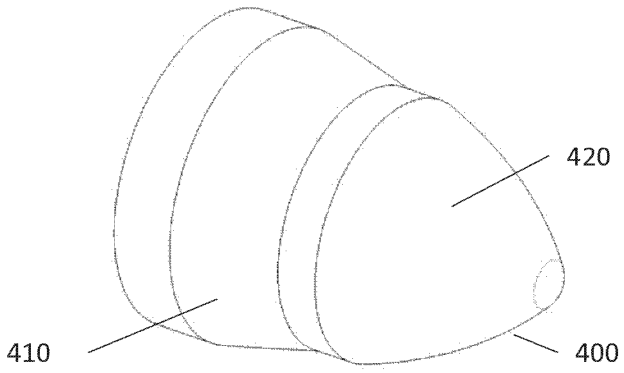
FIGS. 18A through 18C are schematic perspective views of a projectile element of a tool for producing a structure for a component according to an exemplary embodiment.
Figure 18B:
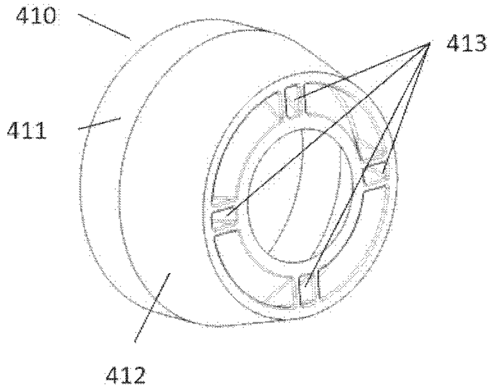
Figure 18C:
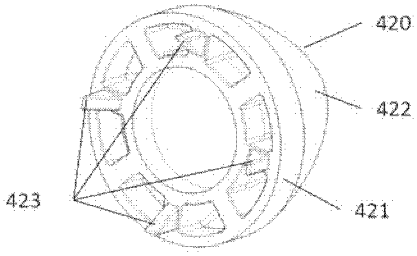
Figure 19A:
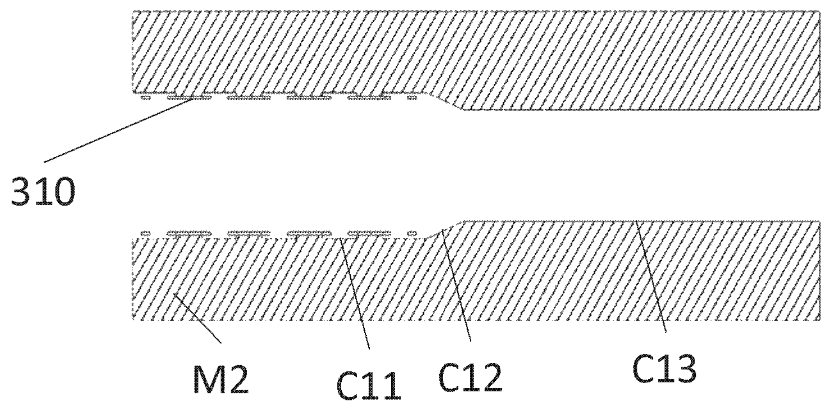
FIGS. 19A through 19E are schematic cross-section views of a method of using a mold tool for producing a structure for a component according to an exemplary embodiment.
Figure 19B:
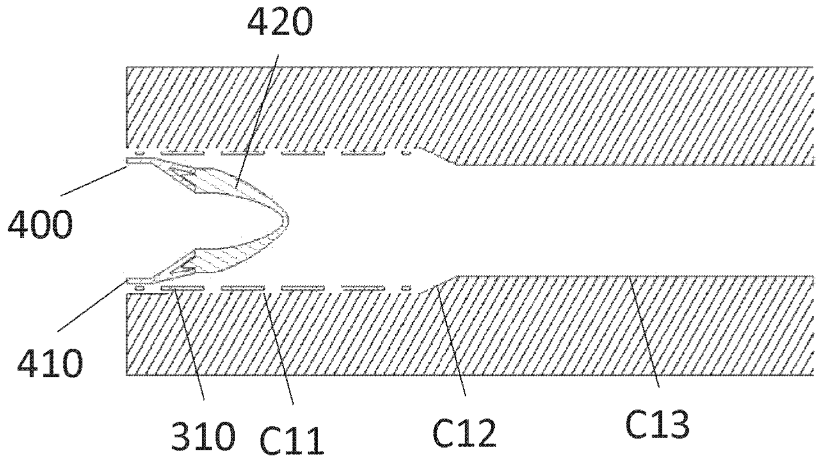
Figure 19C:
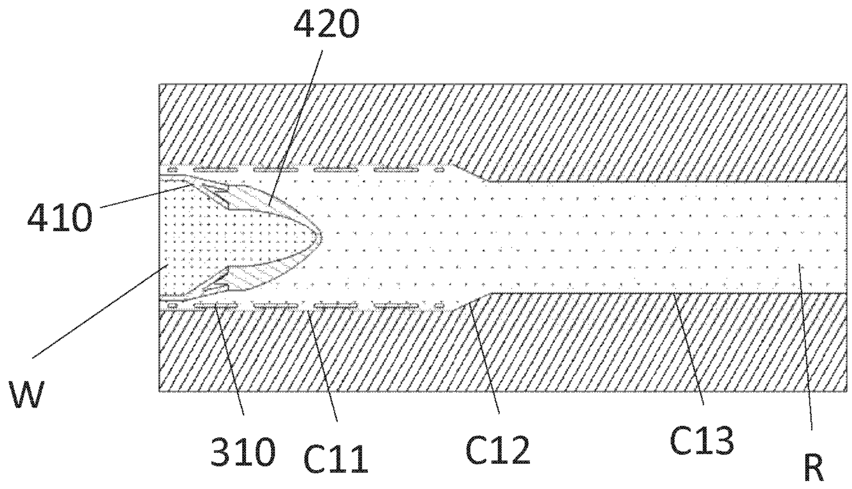
Figure 19D:
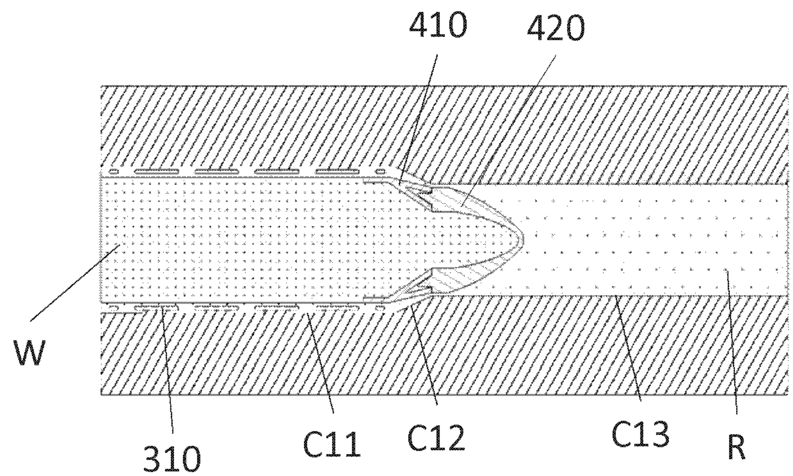
Figure 19E:
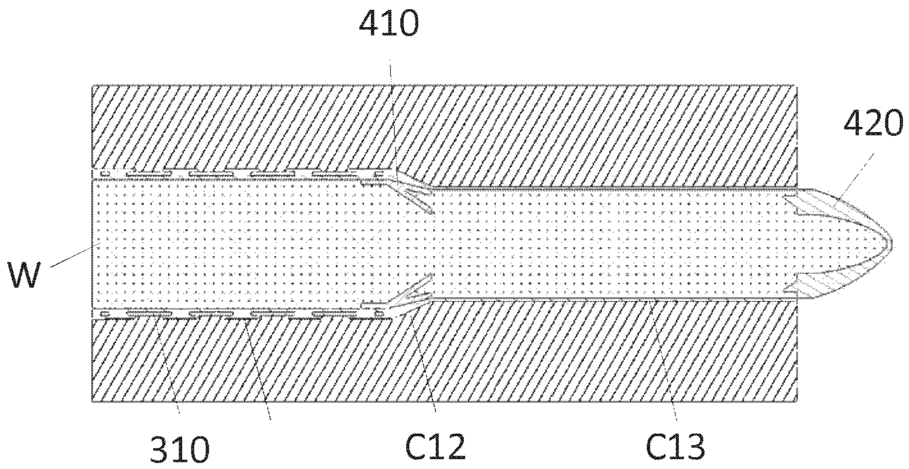
Figure 19F:
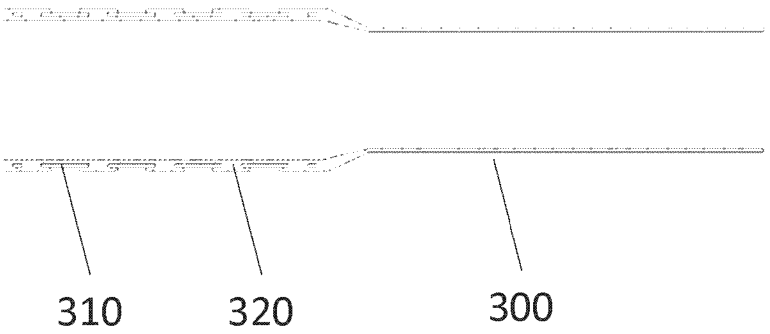
FIG. 19F is a schematic cross-section view of a structure for a component according to an exemplary embodiment.

According to an exemplary embodiment as shown schematically in FIGS. 17A-17C, the resin melt R when cooled/solidified produces the component/structure 300 shown with metal/insert section 310 and plastic/resin section 320 (e.g. after the injection molding method is completed).

According to an exemplary embodiment as shown schematically, pressure from resin melt R may be relatively evenly distributed/filled inside and outside of metal pipe 210 during injection molding; the water flow W within inset/pipe 210 may be at a pressure sufficient for to push the projectile 10 to travel across the insert/pipe 210 (e.g. higher pressure may not be required to resist the injection pressure of the resin); requirement on water flow W pressure may be reduced (e.g. high-pressure water flow equipment not required, reducing initial/operating cost for equipment).

According to an exemplary embodiment as shown schematically in FIGS. 2, 3 and 17A-17C, the hybrid beam 300 may be arranged in the instrumental panel IP of the vehicle V; the hybrid beam 300 may comprise a plastic pipe wall 320 and a metal pipe 310 (e.g. at least partially embedded in the plastic/resin material). According to an exemplary embodiment as shown schematically in FIGS. 17A-17C, for the structure of component/beam 300 the metal pipe/insert 310 spans a partial length (e.g. arranged in a region corresponding to a driver side to enhance the strength of the beam on the driver side region). The hybrid beam 300 may be a constant-diameter pipe or a variable-diameter pipe (e.g. with variations in forming methods).

According to an exemplary embodiment as shown schematically in FIGS. 16A-16E, an insert injection molding method may use mold M1 with at least two continuous cavity segments with the same inner diameters; the metal pipe 310 may be fixed in one of the cavity segments to maintain a forming structure within the cavity segment to which the metal pipe 310 is fixed and a position/connection between the metal pipe 310 and the cavity segments by mold features such as bosses P and positioning ribs E (e.g. in segments in region of insert but not required for the remaining cavity segments). After the metal pipe 310 is fixed in a cavity segment; the projectile 10 may be placed at one end of the cavity C1, gaps may be formed between the projectile 10 and the inner surface of the cavity C1 and the inner surface of the metal pipe 310, the mold may be closed after the projectile 10 is placed; the resin melt R may be injected into the cavity C1. According to an exemplary embodiment, the projectile 10 may travel from one end of the cavity C1 to the other end under the action of water flow, the mold may be opened after the resin melt R is cooled; the component produced may comprise a tubular hybrid beam structure having uniform wall thickness and same inner and outer diameters and with the metal pipe 310 at least partially embedded in the formed plastic/resin material.

According to an exemplary embodiment as shown schematically in FIGS. 18A-18C and 19A-19F, to form an injection molded part of the method and with the structure of the variable-diameter hybrid beam 300, a tool element shown as a projectile 400 comprising at least two-stage detachably connected projection parts (e.g. stages 410 and stage 420) may be provided and an insert injection molding method may be employed to use the projectile. The cavity segments of the cavity C1 have different inner diameters; the projection parts of the projectile have different outer diameters; the projection parts correspond to the cavity segments of the cavity C1 one by one; during injection molding, each projection part stays in the corresponding cavity segment, the inner diameters of the cavity segments may be outer diameters of the hybrid beam structure with variable diameters; the gap between each projection part and each cavity segment may be the wall thickness of the hybrid beam structure with variable diameters, so that the variable-diameter hybrid beam structure with a uniform wall thickness can be formed.

According to an exemplary embodiment as shown schematically in FIGS. 18A-18C and 19A-19F, the projectile 400 may comprise a first-stage projection part 410 and a second-stage projection part 420; each stage/part may be axially connected. According to an exemplary embodiment as shown schematically in FIGS. 18A-18C and 20, the first-stage projection part 410 may be a through-type structure with two open ends and may comprise a first-stage molded segment 411 and an adjacent transition segment 412; an end surface of one end (e.g. away from the first-stage molded segment 411 of the transition segment 412) with first-stage projection part 410 may be provided with a plurality of openings 413. As shown schematically in FIG. 18C, the second-stage projection part 420 may comprise a structure having one open end, the other closed end and a hollow interior, and may comprise a second-stage molded segment 421 and an adjacent closed segment 422; an outer diameter of the second-stage molded segment 421 may be designed to be smaller than that of the first-stage molded segment 411. An end surface of the second-stage molded segment 421 has a plurality of axially extending second positioning ribs 423 matching with the openings 413; the second positioning ribs 423 are inserted into the openings 413 to realize the connection and synchronous rotation of the first-stage projection part 410 and the second-stage projection part 420. The second positioning ribs 423 and the openings 413 both extend axially; after the second positioning ribs 423 are inserted into the openings 413, the rotation between the first-stage projection part 410 and the second-stage projection part 420 may be restricted; the axial movement between the two may not be restricted in order to ensuring the first-stage projection part 410 and the second-stage projection part 420 to synchronously rotate on one hand and enabling the first-stage projection part 410 and the second-stage projection part 420 to be detached. The plurality of openings 413 and the plurality of second positioning ribs 423 may be uniformly arranged circumferentially provide for a stable connection between the first-stage projection part 410 and the second-stage projection part 420. See FIGS. 18A-18C and 20.

According to an exemplary embodiment as shown schematically in FIGS. 18A-18C and 19A-19E, a method of injection molding may comprise use of the two-stage projectile 400 of the present invention; the mold may comprise a cavity C1 intended to provide three continuous cavities C11, C12 and C13 (corresponding to the first-stage molded segment 411, the transition segment 412 and the second-stage projection part 420) with different the inner diameters. According to an exemplary embodiment as shown schematically, insert/metal pipe 310 may be fixed in the cavity C11; in the method of producing the component, the projectile 400 may be placed in the metal pipe 310, the mold may be closed and the resin melt R may be injected into the mold M1 so as to fill the cavity C1 and the interior of the metal pipe 310, the nozzle may inject the water flow W into the projectile 400 under pressure so that the projectile 400 travels in the metal pipe 310; an inner diameter of the cavity C12 may be smaller than the outer diameter of the first-stage molded segment 411; when the projectile travels to the cavity C12, the first-stage projection part 410 may be restricted and stop in the cavity C12 (e.g. due to reduced size, by a mold feature/design such as a stopper, rib, boss, etc.); the second-stage projection part 420 may be detached from the first-stage projection part 410 under the water flow W and continues to travel in the cavities C12 and C13 to the other end of the cavity C1. See FIGS. 19A-19E. According to an exemplary embodiment as shown schematically, after the resin melt R remaining in the cavity C1 is cooled and solidified, the mold may be opened; the injection molding may be finished; the finally formed variable-diameter hybrid beam 300; beam 300 may comprise the metal pipe 310 and the resin structure; the resin structure passes through the metal pipe 310 from an outer surface of the metal pipe 310 and covers an inner surface of the metal pipe to form the plastic pipe wall 320 of the hybrid beam 300.

According to an exemplary embodiment as shown schematically in FIGS. 19A-19E and 20, thrust from the water flow W and the resistance from the resin melt R received by the closed segment 422 and the transition segment 412 are adjusted by designing axial projected areas and inclination angles of the inner and outer surfaces of the closed segment 422 and the transition segment 412; projectile 400 may be pushed/thrust to travel in the cavity C1 by the water flow W (e.g. push/thrust from the water flow W to the projectile may be larger than the resistance from the resin melt R to the projectile).

Figure 20:
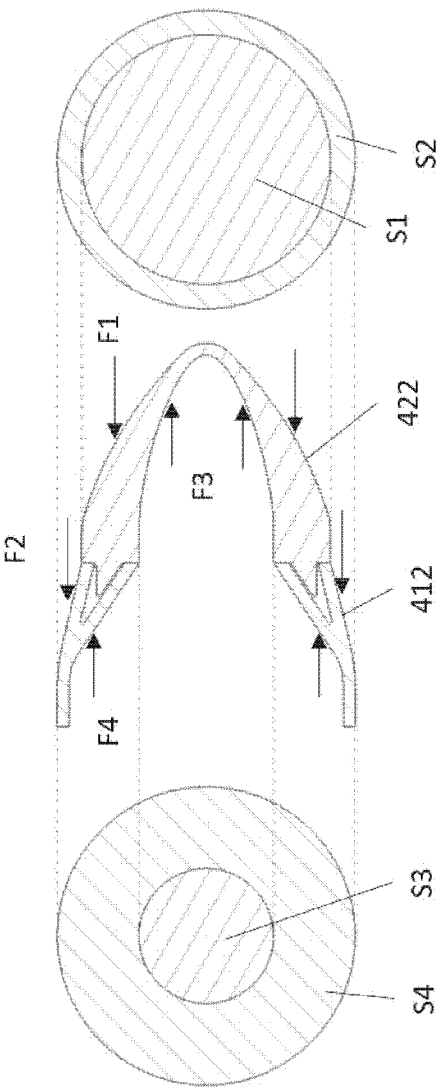
FIG. 20 is a schematic cross-section view of a projectile element of a tool for producing a structure for a component according to an exemplary embodiment.

As shown schematically in FIG. 20, the tool element/projectile may comprise surfaces with inclination angles of inner and outer surfaces of the closed segment 422 and the transition segment 412; the axial projected area S1 of the outer surface of the closed segment 422 may be designed to be larger than the axial projected area S2 of the outer surface of the transition segment 412; axial pressure F1 of the resin melt R to the second-stage projection part 420 may be larger than the axial pressure F2 of that to the first-stage projection part 410; the axial projected area S3 of the inner surface of the closed segment 422 may be designed to be smaller than the axial projected area S4 of the inner surface of the transition segment 412; the axial reverse pressure F3 of the water flow W to the second-stage projection part 420 may be smaller than the axial reverse pressure F4 of that to the first-stage projection part 410; when the two-stage projectile 400 travels in the cavity C11, the second-stage projection part 420 may be tightly pressed against the first-stage projection part 410; the open end of the second-stage projection part 420 may be tightly fitted with a step 415 of the first-stage projection part 410 (e.g. to provide a firm connection and sealing between the first-stage projection part 410 and the second-stage projection part 420); to further improve the sealing property between the first-stage projection part 410 and the second-stage projection part 420, a sealing ring may be provided. According to an exemplary embodiment, the metal pipe may be arranged in cavity C13 instead of C11, such that the metal pipe with the hybrid beam is located in a pipe segment with larger diameter. According to an exemplary embodiment the first-stage molded segment 411 and the second-stage molded segment 421 are both hollow cylinders, the transition segment 412 may be a hollow frustum of a cone; the closed segment 422 may be a hollow cone. The tool element/projectile may be configured to comprise three-stage or more projection parts. According to an exemplary embodiment as shown schematically, the structure of the projectile with first-stage projection part 410 may be arranged between the first-stage projection part 410 and the two-stage projection part 420; outer diameters and inner diameters may be smaller than the first-stage projection part 410; the plurality of projection parts may be sequentially/detachably connected to form the multi-stage projectile. See FIGS. 19A-19E. The variable-diameter hybrid beam with various diameters can be formed by adopting the multi-stage projectile; the metal pipe can be selectively placed on any one or more pipe segments with different diameters.

Exemplary Embodiments—B

According to an exemplary embodiment as shown schematically in FIGS. 15A-15C and 16A-16H, an insert injection molding method and an injection molded part formed by the insert injection molding method may be provided; an injection molded part may be formed with a reliable connection between a metal insert and a plastic part.

According to an exemplary embodiment as shown schematically, an improved insert injection molding method may comprise the steps of: (a) providing a metal pipe and fixing the metal pipe in a cavity of a mold with a plurality of through holes are arranged in the metal pipe; a first gap may be formed between the metal pipe and an inner surface of the cavity; (b) providing a projectile connected with a nozzle and placing the projectile within the cavity; (c) injecting a resin melt into the cavity after closing the mold; the resin melt fills the first gap and fills an interior of the metal pipe through the through holes in the metal pipe; (d) applying a pressurized water flow to the projectile by the nozzle to enable the projectile to pass through the interior of the metal pipe to extrude a portion of the resin melt inside the metal pipe; (e) arranging the projectile to form a second gap with an inner wall surface of the metal pipe; the resin melt in the second gap may remain inside the metal pipe; and (f) opening the mold after the resin melt in the cavity is cooled and solidified and finishing injection molding. See FIGS. 16A-16E.

According to an exemplary embodiment, at least one first positioning rib may be arranged on the inner surface of the cavity; the at least one first positioning rib may be inserted into at least one through hole of the metal pipe. According to an exemplary embodiment, the inner surface of the cavity may be provided with a plurality of bosses axially along the metal pipe; the metal pipe may abut against the bosses. According to an exemplary embodiment, the cavity may comprise at least two cavity segments; the metal pipe may be secured within at least one of the at least two cavity segments. According to an exemplary embodiment, the at least two cavity segments have different inner diameters. According to an exemplary embodiment, the projectile may comprise at least at least two-stage detachably connected projection parts; the projection parts correspond to the cavity segments one by one. According to an exemplary embodiment, the projection parts stay sequentially in the corresponding cavity segments during the travel of the projectile.

According to an exemplary embodiment, the projectile may comprise a first-stage projection part and a second-stage projection part, the first-stage projection part may be a through-type structure with two open ends, the second-stage projection part may have an open end and a hollow interior; the first-stage projection part may be connected with the open end of the second-stage projection part.

According to an exemplary embodiment, an end surface of the first-stage projection part may be provided with a plurality of openings; an end surface of the second-stage projection part has a plurality of axially extending second positioning ribs matching with the openings. According to an exemplary embodiment as shown schematically, an injection molded part may be produced using the insert injection molding method with an insert/metal pipe and a resin structure; the resin structure may be formed to cover an inner surface of the metal pipe after passing through the metal pipe from an outer surface of the metal pipe.

According to an exemplary embodiment as shown schematically, in an insert injection molding method an insert such as a metal pipe may be positioned so that when the mold is filled with resin melt R pressure is distributed/communicated (e.g. with the inside and the outside) and is filled with the resin melt during injection molding. According to an exemplary embodiment as shown schematically in FIGS. 16A-16E and 19A-19E, high-pressure water flow into the metal pipe to enable the pressure inside and outside the metal pipe to be consistent may not be required; the water flow to provide a pressure for pushing the projectile to travel in the metal pipe may not need to resist the injection pressure of the resin; the insert injection molding method may operate with water flow pressure that is greatly reduced; the requirement on high-pressure water flow equipment may be reduced.

According to an exemplary embodiment as shown schematically, for an injection molded part formed by the insert injection molding method, the inner and outer surfaces of the metal pipe may be covered with the plastic parts; the metal pipe may be equivalently formed within/between the plastic parts on the inner and outer surface; the metal pipe and the plastic parts are more firmly connected and have higher strength.

According to an exemplary embodiment as shown schematically in FIGS. 19A-19E, an insert injection molding method may comprise providing a metal pipe and fixing the metal pipe in a cavity of a mold; a plurality of through holes may be arranged in the metal pipe; a first gap may be formed between the metal pipe and an inner surface of the cavity; providing a projectile connected with a nozzle and placing the projectile within the cavity; injecting a resin melt into the cavity after closing the mold; the resin melt may fill the first gap and may fill an interior of the metal pipe through the through holes in the metal pipe; applying a pressurized water flow to the projectile by the nozzle to enable the projectile to pass through the interior of the metal pipe to extrude a portion of the resin melt inside the metal pipe; arranging the projectile to form a second gap with an inner wall surface of the metal pipe; the resin melt in the second gap may remain inside the metal pipe; and opening the mold after the resin melt in the cavity is cooled and solidified, and finishing injection molding. According to an exemplary embodiment as shown schematically, at least one first positioning rib may be arranged on the inner surface of the cavity; the at least one first positioning rib may be inserted into at least one through hole of the metal pipe; the inner surface of the cavity may be provided with a plurality of bosses axially along the metal pipe; the metal pipe may be abutted against the bosses; the cavity may comprise at least two cavity segments. According to an exemplary embodiment as shown schematically, the metal pipe may be secured within at least one of the at least two cavity segments; at least two cavity segments may have different inner diameters. According to an exemplary embodiment as shown schematically in FIGS. 18A-18C, 19A-19E and 20, the tool element/projectile may comprise at least two-stage detachably connected projection parts; the projection parts may correspond to the cavity segments one by one; the projection parts may stay sequentially in the corresponding cavity segments during the travel of the projectile; the projectile may comprise a first-stage projection part and a second-stage projection part; the first-stage projection part may comprise a through-type structure with two open ends; the second-stage projection part may comprise an open end and a hollow interior; the first-stage projection part may be connected with the open end of the second-stage projection part; an end surface of the first-stage projection part may be provided with a plurality of openings; an end surface of the second-stage projection part may comprise a plurality of axially extending second positioning ribs matching with the openings; an injection molded part may be manufactured by the insert injection molding method. According to an exemplary embodiment as shown schematically in FIGS. 2, 3 and 19A-19E, the component/part may comprise a metal pipe and a resin structure. A resin structure may be formed to cover an inner surface of the metal pipe after passing through the metal pipe from an outer surface of the metal pipe.

Exemplary Embodiments—C

As a result of continuous improvement efforts relating to manufacturing techniques and material performance, high-performance plastics may increasingly be used instead of metals (e.g. plastics that have in higher costs); use of low-cost plastic materials may be used (with the defects of material performance avoided) by engineered improvements relating to structure/form and by use of reinforcing structures (e.g. inserts, etc.) that do not occupy a large amount of space.

Figure 21A:
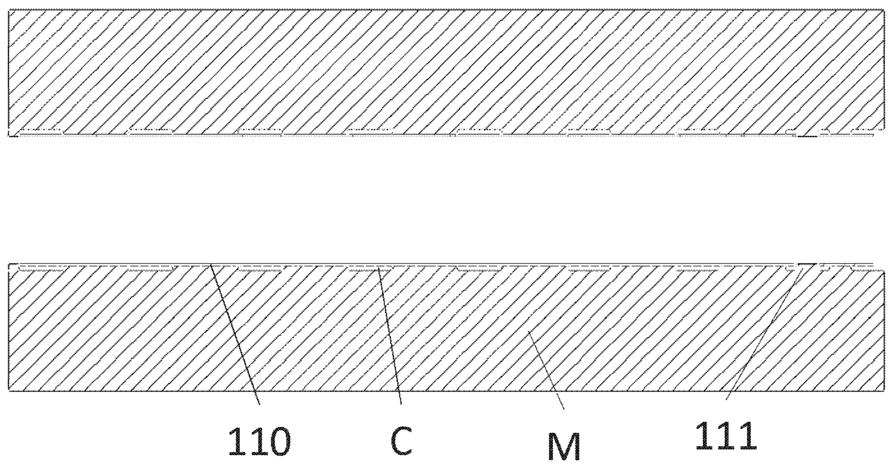
FIGS. 21A through 21B are schematic cross-section views of a method of using a mold tool for producing a structure for a component according to an exemplary embodiment.
Figure 21B:
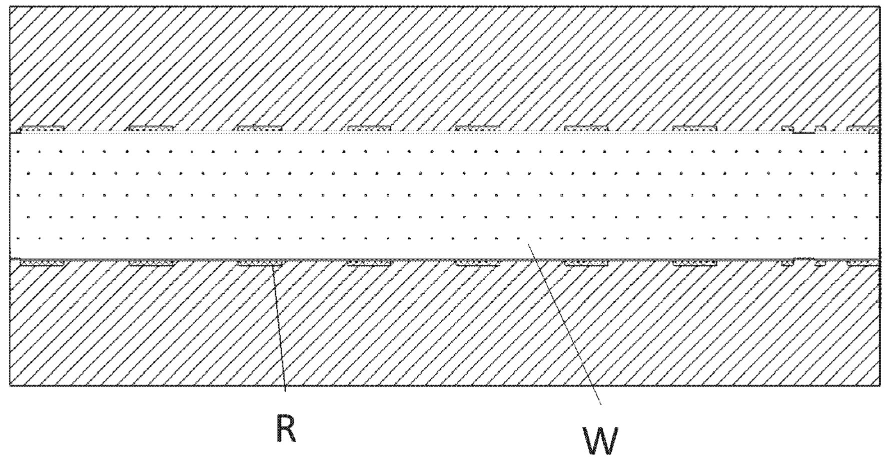
Figure 21C:
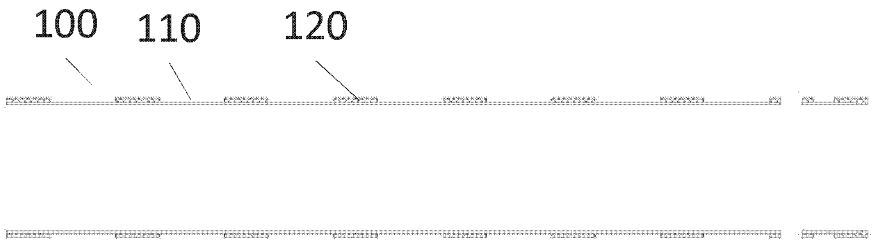
FIG. 21C is a schematic cross-section view of a structure for a component according to an exemplary embodiment.

According to an exemplary embodiment as shown schematically in FIGS. 21A-21C, a generally conventional method is shown; the method may comprise local reinforcement by use of inserts (e.g. partially inserting metals); a metal pipe 110 is placed in a mold M and fixed before injection molding; a wall of the metal pipe 110 is complete and has no holes, or there are few positioning holes 111 for positioning with the mold M. After the mold is closed, a high-pressure water flow W is injected into the pipe of the metal pipe 110; a resin melt R is injected into the mold M, so that the resin melt R fills the gap between the metal pipe 110 and an inner surface of a cavity C; the pressure balance between an inner surface and an outer surface of the metal pipe 110 is ensured, thereby preventing the metal pipe 110 from being deformed. After the resin melt R is cooled, the mold is opened to take out a product 100, the molded product 100 may comprise the metal pipe 110 and a plastic part 120; as indicated schematically, the outer surface of the metal pipe 110 is covered with the plastic part/material 120 while the inner surface of the metal pipe 110 has no plastic part/material 120; the metal pipe 110 is connected with the plastic material only at the surface; such a connection is not highly reliable and/or requires additional additives to increase the connection strength between the plastic and the metal structure; the generally conventional method of partially inserting metal requires equalization of pressure of the high-pressure water flow injected into the pipe of the metal pipe 110 as for the injection pressure of the resin melt R outside the pipe; a requirement of high pressure for the water flow may increase operating cost and equipment cost.

According to an exemplary embodiment, an insert injection molding method may produce an improved injection molded part; the improved method may comprise the steps of fixing a metal pipe in a cavity of a mold; a first gap is formed between the metal pipe and the cavity; a plurality of through holes are arranged in the metal pipe; placing a projectile within the metal pipe; a second gap is formed between the projectile and the metal pipe; closing the mold and injecting a resin melt into the cavity; applying a pressurized water flow to the projectile after the first gap, the second gap and an interior of the metal pipe are filled with the resin melt to enable the projectile to pass through the interior of the metal pipe; opening the mold after the resin melt in the cavity is cooled and solidified and finishing injection molding. The water flow used in the insert injection molding method of the present invention needs to provide pressure for pushing the projectile to travel in the metal pipe (not to be in equilibrium with the injection molding pressure of the plastic material); the improved insert injection molding method provides (among other advantages) that the requirement on water flow pressure is greatly reduced, so that the requirement on high-pressure water flow equipment is also greatly reduced as to allow for lower equipment cost.

TABLE A

REFERENCE SYMBOL LIST

| ELEMENT, PART OR COMPONENT | REFERENCE SYMBOL |
|---|---|
| Vehicle | V |
| Interior | I |
| Instrument panel | IP |
| Cross-beam | CB |
| Structure/tube structure | TS |
| Section of structure | TSA |
| Section of structure | TSB |
| Insert/tube/pipe | NT |
| Holes | NH |
| Plastic material | PM |
| Resin material/plastic material | R |
| Water | W |
| Mold/mold tool | M |
| Top of mold tool | MT |
| Bottom of mold tool | MB |
| Section of mold tool cavity | MSA |
| Section of mold tool cavity | MSB |
| Feature of mold tool | MF |
| Projectile element | FT |
| Stage of projectile element (front stage) | FP |
| Stage of projectile element (base stage) | FS |
| Projectile element | FTX |
| Stage of projectile element (base stage) | FSX |
| Inner diameter | D |
| Cavity | C1 |
| | C11, C12, C13 |
| Projected area | S1, S2, S3, S4 |
| Force/axial resistance/thrust/pressure | F1, F2, F3, F4 |
| Beam/hybrid beam | 200 |
| Insert/pipe/metal pile | 210 |
| Holes (insert) | 211 |
| Insert wall/pipe wall | 220 |
| Beam/hybrid beam | 300 |
| Insert/pipe/metal pile | 310 |
| Insert wall/pipe wall | 320 |
| Positioning rib | E |
| Projections/bosses | P |
| Gap | G |
| Nozzle | N |
| Projectile | 10 |
| Projectile | 400 |
| Part of projectile | 410 |
| Stage of projectile | 420 |
| Segment | 411 |
| Segment (transition) | 412 |
| Opening | 413 |

TABLE A-continued

REFERENCE SYMBOL LIST

| ELEMENT, PART OR COMPONENT | REFERENCE SYMBOL |
|---|---|
| Step | 415 |
| Segment | 421 |
| Segment | 422 |
| Ribs | 423 |
| insert injection molding method | 1 |
| injection molded part | 2 |
| through hole | 3 |
| pressurized water flow | 4 |
| Boss | 5 |
| Insert | 6 |
| projection part | 7 |
| projected area | 8 |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A method of producing a structure with an insert for a component for a vehicle interior in a mold comprising a cavity using a projectile element comprising the steps of:

(a) providing the mold with the cavity;
(b) providing the insert in the cavity;
(c) providing the projectile element at the cavity;
(d) providing resin into the cavity;
(e) providing water into the cavity to push the projectile element through the insert into resin in the cavity;
(f) pushing the projectile element through the insert and through resin across the cavity;
(g) exiting the projectile element from the cavity;

wherein the component comprises a first section comprising the insert and resin formed into and around the insert;
wherein the insert comprises a tube configured to provide a structure within the component;
wherein resin formed in and around the insert in the mold is configured to provide a formed resin component comprising the structure of the insert within the resin component.

2. The method of claim 1 wherein the insert comprises a metal insert.

3. The method of claim 2 wherein the metal insert comprises a pipe.

4. The method of claim 1 wherein the insert comprises an axial opening and a radial set of holes; wherein resin formed around the insert comprises resin formed into and around the insert in a set of radial rings.

5. The method of claim 1 wherein the component comprises a multi-section component comprising the first section comprising the insert and resin formed into and around the insert and a second section comprising resin.

6. The method of claim 5 wherein the first section of the component comprising the insert and resin formed into and around the insert has an inner diameter larger than an inner diameter of the second section of the component.

7. A method of producing a structure with an insert for a component for a vehicle interior in a multi-section mold comprising a cavity with a first section and a second section using a multi-stage projectile element with a base stage and a front stage comprising the steps of:

(a) providing the mold with multi-section cavity;
(b) providing the insert in the first section of the cavity;
(c) providing the multi-stage projectile element;
(d) providing resin into the cavity;
(e) providing water into the cavity to push the multi-stage projectile element through the insert into resin in the cavity;
(f) pushing the multi-stage projectile element through the insert and through resin across the first section of the cavity;
(g) separating the base stage of the multi-stage projectile element from the front stage of the multi-stage projectile element between the first section of the cavity and the second section of the cavity;
(h) pushing the front stage of the multi-stage projectile element through the insert and through resin across the second section of the cavity;
(i) exiting the front stage of the multi-stage projectile element from the cavity;

wherein the insert comprises a metal pipe configured to provide a structure for the component;
wherein the component comprises a resin component comprising the structure of the insert and resin into and around the structure of the insert within the resin component.

8. The method of claim 7 wherein the front stage of the multi-stage projectile element is separated from the base stage of the multi-stage projectile element at a feature between the first section of the cavity and the second section of the cavity.

9. The method of claim 7 wherein the component comprises a section formed with the base stage of the multi-stage projectile element.

10. The method of claim 7 wherein the component comprises a multi-section component; wherein the resin component comprises the insert and resin formed in a set of rings around the insert.

11. The method of claim 10 wherein the multi-section component comprises a first section of the component formed of resin around the insert and a second section of the component formed of resin.

12. The method of claim 7 further comprising the step of removing the resin component formed with the insert and the base stage of the multi-stage projectile element from the mold.

13. The method of claim 7 wherein the step of separating the base stage of the multi-stage projectile element from the front stage of the multi-stage projectile element comprises engagement of the base stage of the multi-stage projectile element with a mold feature.

14. The method of claim 13 wherein the mold feature is between the first section of the cavity and the second section of the cavity.

15. The method of claim 7 wherein the insert comprises an axial opening and a radial set of holes.

16. The method of claim 7 wherein the step of separating the base stage of the multi-stage projectile element from the front stage of the multi-stage projectile element between the first section of the cavity and the second section of the cavity comprises engagement of the base stage of the projectile element with a mold feature; wherein the mold feature comprises a reduction in size of an effective inner diameter between the first section of the cavity and the second section of the cavity.

17. The method of claim 7 configured to produce the component in the mold with the multi-stage projectile element comprising a structure comprising a first section and a second section;

wherein the structure is formed from a resin material;
wherein the structure comprises a central opening formed by the projectile element;
wherein a cross-section area of the first section is larger than a cross-section area of the second section.

18. The method of claim 17 wherein the structure is formed by injecting water to push the projectile element through a cavity in the mold containing the resin material; wherein the projectile element comprises a perimeter surface; wherein water and resin material are in contact adjacent the perimeter surface; wherein the resin material is provided as the perimeter surface of the structure.

19. The method of claim 17 wherein the projectile element comprises a multi-stage element; wherein the multi-stage element comprises a front stage and a base stage;

wherein the base stage is detachable from the front stage; wherein the structure comprises the base stage of the multi-stage projectile element.

20. The method of claim 17 wherein the component comprises a cross-car beam; wherein the first section of the structure comprises a first diameter; wherein the second section of the structure comprises a second diameter; wherein the first diameter is greater than the second diameter.

* * * * *